(12) United States Patent
Alameh et al.

(10) Patent No.: US 10,133,304 B2
(45) Date of Patent: Nov. 20, 2018

(54) PORTABLE ELECTRONIC DEVICE PROXIMITY SENSORS AND MODE SWITCHING FUNCTIONALITY

(71) Applicant: Motorola Mobility LLC, Chicago, IL (US)

(72) Inventors: Rachid M Alameh, Crystal Lake, IL (US); Kevin J McDunn, Lake in the Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 357 days.

(21) Appl. No.: 14/721,647

(22) Filed: May 26, 2015

(65) Prior Publication Data

US 2016/0349792 A1     Dec. 1, 2016

(51) Int. Cl.
| | |
|---|---|
| *G06F 3/041* | (2006.01) |
| *G06F 1/16* | (2006.01) |
| *G06F 3/01* | (2006.01) |
| *G06F 3/042* | (2006.01) |

(52) U.S. Cl.
CPC ............ *G06F 1/1626* (2013.01); *G06F 3/011* (2013.01); *G06F 3/042* (2013.01); *G06F 3/0412* (2013.01); *G06F 3/0416* (2013.01); *G06F 3/0421* (2013.01); *G06F 2203/04808* (2013.01)

(58) Field of Classification Search
CPC ...... G06F 3/011; G06F 3/0412; G06F 3/0416; G06F 3/042
USPC .................................................. 345/156–184
See application file for complete search history.

(56) References Cited

U.S. PATENT DOCUMENTS

| | | | | |
|---|---|---|---|---|
| 2011/0248152 A1* | 10/2011 | Svajda | .................. | G01S 3/7803 250/221 |
| 2013/0057573 A1* | 3/2013 | Chakravarthula | ...... | G06F 3/005 345/619 |
| 2013/0222271 A1* | 8/2013 | Alberth | .................. | G06F 1/163 345/173 |
| 2014/0029810 A1* | 1/2014 | Barr | .................... | G06K 9/00295 382/118 |
| 2014/0285352 A1* | 9/2014 | Cho | ........................ | G06F 3/013 340/691.5 |
| 2015/0003691 A1* | 1/2015 | Joo | ..................... | G06K 9/00604 382/117 |
| 2015/0046825 A1* | 2/2015 | Li | ........................ | G06F 3/0481 715/728 |
| 2015/0332032 A1* | 11/2015 | Alameh | .................... | G06T 7/20 726/30 |

(Continued)

*Primary Examiner* — Carolyn R Edwards
(74) *Attorney, Agent, or Firm* — Philip H. Burrus, IV

(57) ABSTRACT

An electronic device includes a housing. One or more processors are operable with a plurality of proximity sensor components that can be disposed behind a grille defining a plurality of reception beams with at least a first reception beam oriented at least partially in a first direction and at least a second reception beam oriented at least partially in a second direction. The one or more processors can detect a person is within a thermal reception radius along the first direction, and can determine whether another person is within the thermal reception radius along the second direction. Where only the person is within the thermal reception radius, the electronic device can operate in a first mode of operation. When the person and another person are within the thermal reception radius, the electronic device can operate in a second mode of operation.

20 Claims, 17 Drawing Sheets

(56) References Cited

U.S. PATENT DOCUMENTS

2015/0347732 A1* 12/2015 Alameh ................ G06F 21/32
                                                                   726/19

* cited by examiner

PORTABLE ELECTRONIC DEVICE PROXIMITY SENSORS AND MODE SWITCHING FUNCTIONALITY

BACKGROUND

Technical Field

This disclosure relates generally to electronic devices, and more particularly to portable electronic devices having proximity sensors.

Background Art

Proximity sensors detect the presence of nearby objects before those objects contact the device in which the proximity sensors are disposed. Illustrating by example, some proximity sensors emit an electromagnetic or electrostatic field. A receiver then receives reflections of the field from the nearby object. The proximity sensor detects changes in the received field to detect positional changes of nearby objects based upon changes to the electromagnetic or electrostatic field resulting from the object becoming proximately located with a sensor.

While prior art proximity detectors are useful for determining when an object is close to an electronic device, prior art proximity detectors generally have difficulty determining where an object may be relative to the device. Additionally, prior art proximity sensors are unable to determine how many objects are near the device. It would be advantageous to have an improved proximity sensor and associated systems and devices.

Figure 1:
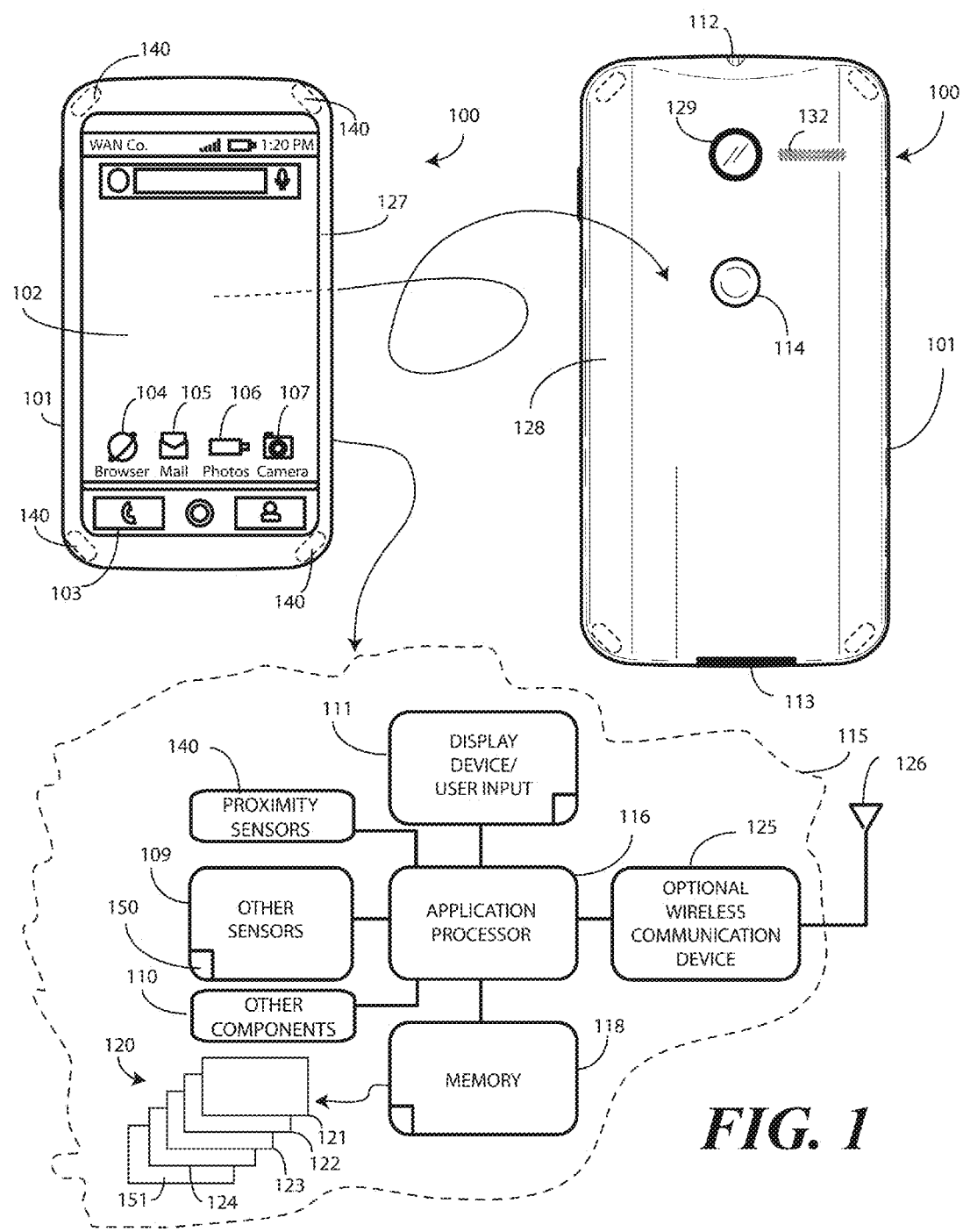
FIG. 1 illustrates one explanatory portable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to using proximity sensor components to control modes of operation of an electronic device. Any process descriptions or blocks in flow charts should be understood as representing modules, segments, or portions of code that include one or more executable instructions for implementing specific logical functions or steps in the process.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of controlling proximity sensors to control device operation as described herein. The non-processor circuits may include, but are not limited to, a radio receiver, a radio transmitter, signal drivers, clock circuits, power source circuits, and user input devices. As such, these functions may be interpreted as steps of a method to perform device control in response to one or more proximity sensors components. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device, which may be portable in one or more embodiments, having a housing. The housing can include a front major face, a rear major face, a first side edge, and a second side edge. In one embodiment, a display or other user interface component is disposed along the front major face. One or more processors can be operable with the display or user interface.

In one embodiment, the electronic device has at least one proximity sensor component that is operable with the one or more processors. In one embodiment, the at least one proximity sensor component comprises a receiver only, and does not include a corresponding transmitter. As used herein, a "proximity sensor component" comprises a signal receiver only that does not include a corresponding transmitter to emit signals for reflection off an object to the signal receiver. A signal receiver only can be used due to the fact that a user's body or other heat generating object external to device, such as a wearable electronic device worn by user, serves as the transmitter.

Illustrating by example, in one the proximity sensor component comprises a signal receiver to receive signals from objects external to the housing of the electronic device. In one embodiment, the signal receiver is an infrared signal receiver to receive an infrared emission from an object such as a human being when the human is proximately located with the electronic device. In one or more embodiments, the proximity sensor component is configured to receive infrared wavelengths of about four to about ten micrometers. This wavelength range is advantageous in one or more embodiments in that it corresponds to the wavelength of heat emitted by the body of a human being. Additionally, detection of wavelengths in this range is possible from farther distances than, for example, would be the detection of reflected signals from the transmitter of a proximity detector component.

In one or more embodiments, each proximity sensor component is disposed about a perimeter of the housing along minor faces of the housing. For example, in one explanatory embodiment four proximity sensor components are disposed at the corners of the housing. In other embodiments, additional proximity sensors can be included. For example, in another embodiment four proximity sensors can be disposed at corners of the device while four additional proximity sensors are disposed along the sides of the housing. This results in eight proximity sensors being used. While the use of additional proximity sensor components can help to increase location and distance resolution, they also increase the cost. Thus, in one embodiment only four proximity sensor components, disposed at the corners of the electronic device, are used.

In one embodiment, each proximity sensor component is disposed behind a grille defining a plurality of distinct reception beams. The plurality of reception beams has associated therewith a reception angle. In one embodiment, to achieve a full 360-degree proximity detection coverage about the device, each reception angle is obtuse, i.e., greater than ninety degrees, such that the reception angle of any one proximity sensor component overlaps the reception angle of at least one other proximity sensor component. In one embodiment, where four proximity sensor components are disposed at the corners of the housing, the reception angle of any one proximity sensor component overlaps at least two other reception angles of at least two other proximity sensor components to provide 360-degree coverage.

In one embodiment, some proximity sensor components are generally oriented in a first direction, while other proximity sensor components are generally oriented in a second direction with no overlap. For example, a first proximity sensor component can be located at a first corner disposed at a first end of the housing, while a second proximity sensor component can be located at a second corner at the first end of the housing. Similarly, a third proximity sensor component can be located at a third corner disposed at a second end of the housing, while a fourth proximity sensor component can be located at a fourth corner disposed at the second end of the housing. In one embodiment, the first end is the top end of the housing, while the second end is the bottom of the housing. In other embodiments, the electronic device can have two proximity sensor components, with one disposed near a loudspeaker at the top of the electronic device, and another disposed near a microphone at the bottom of the electronic device, with each pointing in direction parallel to a major surface of the electronic device. This orientation can result in reception beams begin defined from the minor surfaces in an "edge shoot" orientation.

While the reception angles of these proximity sensors can overlap to provide 360-degree proximity detection coverage, when four proximity sensor components are located at four corners as described in the preceding paragraph, two will define one or more reception beams oriented at least partially in a first direction from the housing while two will define one or more reception beams oriented at least partially in a second direction from the housing. Where, for example, the first end is the top and the second end is the bottom, the first and second proximity sensor components can define one or more reception beams oriented at least partially away from the top of the housing, while the third and fourth proximity sensor components can define one or more reception beams oriented at least partially away from the bottom of the housing. This "different directions with different proximity sensor components" configuration can be used to transition the electronic device from a normal mode of operation to a privacy mode of operation. Additionally, this configuration can be used to drive other features, including a navigation application.

Illustrating by example, when a user is holding the electronic device in their hand with the bottom end facing their body, the third and fourth proximity sensor components will point toward the user. The first and second proximity sensor components will point away from the user. Accordingly, the third and fourth proximity will sense the user's body heat, while the first and second will not sense much heat at all. Where this is the case, the electronic device can operate in a normal mode of operation. However, when the first and second sensors detect another person within a thermal reception radius, in one embodiment the one or more processors can transition the electronic device to a second mode of operation, which is a privacy mode in one or more embodiments. In one or more embodiments, the privacy mode of operation makes information less accessible. For instance, the privacy mode can reduce the volume of an audio output device, preclude presentation of messages on the display, present only a portion of messages on the display, such as presenting only a preview of messages or not presenting the details of messages, can lock the display of the electronic device, or can require user entry of personal identification indicia, such as a fingerprint or personal identification number (PIN). Alternatively, the electronic device can defer new incoming announcements all together when operating in the privacy mode.

In one embodiment, the one or more processors can further require identification of the user. For example, in one or more embodiments a facial recognition device, audio recognition device, iris scan device, fingerprint detector, electronic tag in a trusted companion device, such as a smart watch, or other identification device is operable within the electronic device. Using this component, the one or more processors can identify, at least with a predefined level of certainty, that the person detected by the third and fourth proximity sensor components is actually the owner of the device. When this is the case, the one or more processors can cause the electronic device to operate in the normal mode of operation.

In other embodiments, the proximity sensor components can be used as a navigational device. For example, where the first and second proximity sensor components define one or more reception beams oriented at least partially away from the top of the housing, and the third and fourth proximity sensor components define one or more reception beams oriented at least partially away from the bottom of the housing, as noted above, the third and fourth proximity will sense the user's body heat while the first and second will not sense much heat at all. However, when a third party is detected in front of the user, one or both of the first proximity sensor component and the second proximity sensor component will detect the third party. When this occurs, in one embodiment the one or more processors can present, on a display of the electronic device, an indication that the second person is within the thermal reception radius. In one embodiment this indication is superimposed atop other information being presented on the display. Accordingly, a user can walk down the street reading an electronic newspaper presented on the display and avoid running into passers by without ever looking up. Other applications and advantages of embodiments of the disclosure will be obvious to those of ordinary skill in the art having the benefit of this disclosure.

In one embodiment, the one or more processors operate in conjunction with the plurality of proximity detector components to detect a person is within a thermal reception radius of the electronic device along a first direction, and to determine whether another person is within the thermal reception radius of the electronic device along a second direction that is different from the first. Where only the person is within the thermal reception radius, the one or more processors can operate the electronic device in a first mode of operation. However, where the person and the other person are within the thermal reception radius, the one or more processors can operate the electronic device in a second mode of operation.

In one embodiment, the first mode of operation is a normal mode of operation, while the second mode of operation is a privacy mode of operation. Embodiments of the disclosure contemplate that a user may not want passersby to be privy to private information annunciated from a loudspeaker or presented on the display of an electronic device. This is especially true when the audible or visible output includes an enunciation of personal information. With this unforeseen problem in mind, methods and apparatuses for detecting when multiple people, i.e., a user and at least one third party, are within a thermal reception radius of the electronic device, one or more processors can cause the device to enter a privacy or discrete mode of operation, rather than the normal mode of operation.

The privacy mode of operation can take a variety of different forms. In one embodiment, when in the privacy mode of operation the one or more processors will present an alert of incoming messages on the display, while precluding the content of messages from being presented on the display. Illustrating by example, presume a female user has a date with her fiancée, Buster. She may not want third parties to know the details of the date. Accordingly, when the plurality of proximity sensor components determines that multiple parties are within a thermal reception radius of the device, and Buster sends a message to the user, the display—when operating in the privacy mode—may read only "Message From Buster" while precluding the presentation of the contents of the message, e.g., "I am looking forward to our date tonight at 7 PM at Mac's Restaurant." This prevents the third party from eavesdropping into the user's affairs. Had Buster labeled, stamped, or otherwise marked the message as "private," it would not have even appeared in one embodiment when operating in the privacy mode.

Another simple use case provides an alternate example. Imagine that a user is carrying an electronic device in their hand in front of their body. In one embodiment, the proximity sensor components simultaneously detect the user carrying device with the bottom proximity sensor components and another person can be detected by the proximity sensor components located in the front of the electronic device. An immediate benefit of this occurs due to the fact that an accelerometer is sometimes not fully useful when the electronic device is held in the horizontal orientation. The proximity sensor component closest to user will indicate to which side the user is located. One or more processors can use this information to rotate content toward the user.

In another embodiment, the one or more processors can disable the display of some or all text messages or chat messages when operating in the privacy mode. In another embodiment, the one or more processors can lock the display when operating in the privacy mode, even if the electronic device would otherwise be unlocked due to a nearby "trusted device" such as a paired smart watch or headset. For instance, if the electronic device is unlocked by a nearby trusted Bluetooth.sup™ device, in one embodiment when a plurality of people are detected within the thermal reception radius the one or more processors could lock the electronic device to "step up" security a notch so that no third party tampers with the device while the user is not watching.

In yet another embodiment, the one or more processors can allow access to non-sensitive information, such as Internet search engines, while precluding access to sensitive or private information, such as electronic mail, when operating in the privacy mode. Illustrating by example, embodiments of the disclosure contemplate that the user may not care if a third party uses their device to search for the answer to the question, "How tall is the Sears Tower?" Accordingly, when in the privacy mode access to an Internet search engine may be granted so the third party can search for this answer. However, the user may not want a third party to read electronic mail correspondence from their doctor giving a medical diagnosis. Similarly, the user may not want a third party to read a "Dear John" email from their significant other breaking up with them, or a communication from their significant other using expletives after the user forgot an anniversary. Accordingly, when operating in the privacy mode the one or more processors may allow access to non-sensitive applications while protecting sensitive and/or private applications when operating in the privacy mode.

In yet another embodiment, the one or more processors may override location sensors and beacons when operating in the privacy mode. In another embodiment, the one or more processors may present message and electronic mail subjects only on the display, while preventing the presentation of message or electronic mail content when operating in the privacy mode. The user may be able to unlock the electronic device or turn OFF the privacy mode of operation in some cases where they authenticate themselves to the device with a password, fingerprint, or other identifier. In another embodiment, the electronic device may be placed in a "no loud speak" mode where the volume of an audio output device, such as a loudspeaker, is reduced. In another embodiment, the one or more processors may lock the display of the electronic device. In another embodiment, the one or more processors may require user entry of a PIN for access. In another embodiment, the one or more processors may present only a sneak preview of incoming messages on the display. In another embodiment, the one or more processors may not present detailed message announcements when operating in the privacy mode.

In yet another embodiment, the one or more processors may transition a voice control interface engine operating in the electronic device between a normal mode of operation and a discrete mode of operation. In one embodiment, a voice control interface engine operating in an electronic device is operative to receive a speech command, through a microphone, from a first distance. The voice control interface engine is then to produce, through a loudspeaker and in response to the speech command, an audible output at a first output level. Illustrating by example, the voice control interface engine may be operable to receive voice commands from a user standing two, three, or more feet away and then deliver the audible output to a loudspeaker at a level sufficient for the user to hear it from the same distance. In one embodiment, when operating in the privacy mode, the one or more processors are operable to transition the voice control interface engine to a second mode operative to receive the speech command from a second distance and produce, in response to the speech command, the audible output at a second output level. In one embodiment the second distance is less than the first distance and the second output level is less than the first output level. This second mode of operation, i.e., the discreet mode, allows the user to deliver voice commands with a much lower volume and receive responses at a level that others will not overhear. For instance, when in the discreet mode of operation, the user may whisper voice commands to the microphone, while hearing audible responses from an earpiece speaker rather than a loudspeaker. Embodiments of the disclosure contemplate a user may not care if a third party listens in on the answer to the question, "How tall is the Sears Tower?" However, if the user's voice command had been "play me my voice mail," the user may not want a third party to hear a school teacher's message complaining about their children's behavior.

The examples above of privacy mode operation are illustrative only. Others will be readily obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device, and is shown as a smart phone for illustrative purposes. However, it should be obvious to those of ordinary skill in the art having the benefit of this disclosure that other electronic devices may be substituted for the explanatory smart phone of FIG. 1. For example, the electronic device 100 could equally be a conventional desktop computer, palm-top computer, a tablet computer, a gaming device, a media player, or other device.

This illustrative electronic device 100 includes a display 102, which may optionally be touch-sensitive. In one embodiment where the display 102 is touch-sensitive, the display 102 can serve as a primary user interface 111 of the electronic device 100. Users can deliver user input to the display 102 of such an embodiment by delivering touch input from a finger, stylus, or other objects disposed proximately with the display. In one embodiment, the display 102 is configured as an active matrix organic light emitting diode (AMOLED) display. However, it should be noted that other types of displays, including liquid crystal displays, would be obvious to those of ordinary skill in the art having the benefit of this disclosure.

The explanatory electronic device 100 of FIG. 1 includes a housing 101. In one embodiment, the housing 101 includes two housing members. A front housing member 127 is disposed about the periphery of the display 102 in one embodiment. A rear-housing member 128 forms the backside of the electronic device 100 in this illustrative embodiment and defines a rear major face of the electronic device. Features can be incorporated into the housing members 127, 128. Examples of such features include an optional camera 129 or an optional speaker port 132, which are shown disposed on the rear major face of the electronic device 100 in this embodiment, but could be disposed along the front major face of the electronic device 100 as well about the display 102. In this illustrative embodiment, a user interface component 114, which may be a button or touch sensitive surface, can also be disposed along the rear-housing member 128.

In one embodiment, the electronic device 100 includes one or more connectors 112, 113, which can include an analog connector, a digital connector, or combinations thereof. In this illustrative embodiment, connector 112 is an analog connector disposed on a first edge, i.e., the top edge, of the electronic device 100, while connector 113 is a digital connector disposed on a second edge opposite the first edge, which is the bottom edge in this embodiment.

A block diagram schematic 115 of the electronic device 100 is also shown in FIG. 1. In one embodiment, the electronic device 100 includes one or more processors 116. In one embodiment, the one or more processors 116 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the electronic device 100. Each of the application processor and the auxiliary processor(s) can be configured to process and execute executable software code to perform the various functions of the electronic device 100. A storage device, such as memory 118, can optionally store the executable software code used by the one or more processors 116 during operation.

In this illustrative embodiment, the electronic device 100 also includes a communication circuit 125 that can be configured for wired or wireless communication with one or more other devices or networks. The networks can include a wide area network, a local area network, and/or personal area network. Examples of wide area networks include GSM, CDMA, W-CDMA, CDMA-2000, iDEN, TDMA, 2.5 Generation 3GPP GSM networks, 3rd Generation 3GPP WCDMA networks, 3GPP Long Term Evolution (LTE) networks, and 3GPP2 CDMA communication networks, UMTS networks, E-UTRA networks, GPRS networks, iDEN networks, and other networks.

The communication circuit 125 may also utilize wireless technology for communication, such as, but are not limited to, peer-to-peer or ad hoc communications such as HomeRF, Bluetooth and IEEE 802.11 (a, b, g or n); and other forms of wireless communication such as infrared technology. The communication circuit 125 can include wireless communication circuitry, one of a receiver, a transmitter, or transceiver, and one or more antennas 126.

In one embodiment, the one or more processors 116 can be responsible for performing the primary functions of the electronic device 100. For example, in one embodiment the one or more processors 116 comprise one or more circuits operable with one or more user interface devices 111, which can include the display 102, to present presentation information to a user. The executable software code used by the one or more processors 116 can be configured as one or more modules 120 that are operable with the one or more processors 116. Such modules 120 can store instructions, control algorithms, and so forth.

In one embodiment, the one or more processors 116 are responsible for running the operating system environment 121. The operating system environment 121 can include a kernel 122 and one or more drivers, and an application service layer 123, and an application layer 124. The operating system environment 121 can be configured as executable code operating on one or more processors or control circuits of the electronic device 100.

The application layer 124 can be responsible for executing application service modules. The application service modules may support one or more applications or "apps." Examples of such applications shown in FIG. 1 include a cellular telephone application 103 for making voice telephone calls, a web browsing application 104 configured to allow the user to view webpages on the display 102 of the electronic device 100, an electronic mail application 105 configured to send and receive electronic mail, a photo application 106 configured to permit the user to view images or video on the display 102 of electronic device 100, and a camera application 107 configured to capture still (and optionally video) images. These applications are illustrative only, as others will be obvious to one of ordinary skill in the art having the benefit of this disclosure. The applications of the application layer 124 can be configured as clients of the application service layer 123 to communicate with services through application program interfaces (APIs), messages, events, or other inter-process communication interfaces. Where auxiliary processors are used, they can be used to execute input/output functions, actuate user feedback devices, and so forth.

In one embodiment, a plurality of proximity sensor components 140 can be operable with the one or more processors 116. In one embodiment, the proximity sensor components 140 comprise only signal receivers. In one embodiment, the proximity sensor components 140 comprise infrared receivers. For example, in one embodiment the proximity sensor components 140 comprise signal receivers that receive infrared wavelengths of about 860 nanometers. In one embodiment, the proximity sensor components 140 have a relatively long detection range so as to detect heat emanating from a person's body when that person is within a predefined thermal reception radius. For example, the proximity sensor component may be able to detect a person's body heat from a distance of about ten feet in one or more embodiments. The ten-foot dimension can be extended as a function of designed optics, sensor active area, gain, lensing gain, and so forth.

In one embodiment, each proximity sensor component 140 comprises an infrared signal receiver so as to be able to detect infrared emissions from a person. This is sometimes referred to as a "passive IR system" due to the fact that the person is the active transmitter. Accordingly, the proximity sensor component 140 requires no transmitter since objects disposed external to the housing deliver emissions that are received by the infrared receiver. As no transmitter is required, each proximity sensor component 140 can operate at a very low power level. Simulations show that a group of infrared signal receivers can operate with a total current drain of just a few microamps.

In one embodiment, the signal receiver of each proximity sensor component 140 can operate at various sensitivity levels so as to cause the at least one proximity sensor component 140 to be operable to receive the infrared emissions from different distances. For example, the one or more processors 116 can cause each proximity sensor component 140 to operate at a first "effective" sensitivity so as to receive infrared emissions from a first distance. Similarly, the one or more processors 116 can cause each proximity sensor component 140 to operate at a second sensitivity, which is less than the first sensitivity, so as to receive infrared emissions from a second distance, which is less than the first distance. The sensitivity change can be effected by causing the one or more processors 116 to interpret readings from the proximity sensor component 140 differently. For example, when the electronic device 100 is grabbed, only large readings from the proximity sensor component 140 might cross a less-sensitive threshold set during device grab to be used to control the electronic device 100. In other embodiments, the proximity sensor component 140 can be designed to have changing detection thresholds.

Figure 2:
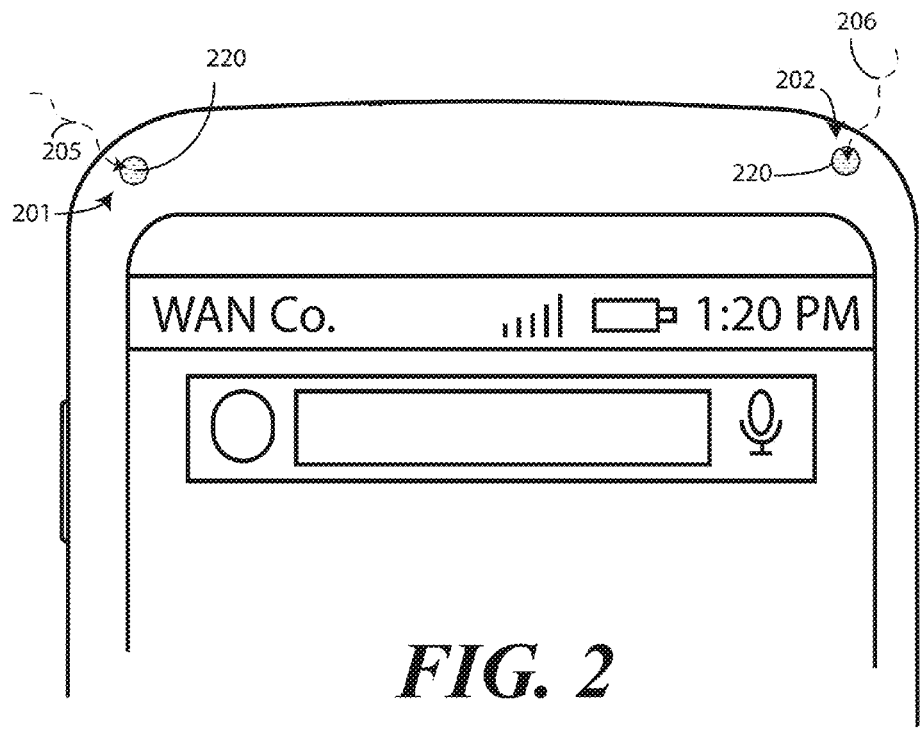
FIG. 2 illustrates explanatory proximity sensor component configurations in accordance with one or more embodiments of the disclosure.

Turning briefly to FIG. 2, illustrated therein are two proximity sensor components 201, 202, each disposed at a corner of the electronic device 100. In this embodiment, each proximity sensor component 201, 202 comprises a signal receiver 220, such as an infrared photodiode, to detect an infrared emission 205, 206 from an object external to the housing 101 of the electronic device 100. No corresponding transmitter is included or required for the proximity sensor component 201, 202 to function. As no active transmitter emitting signals is included, each proximity sensor component 201, 202 is sometimes referred to as a "passive" proximity sensor.

Figure 3:
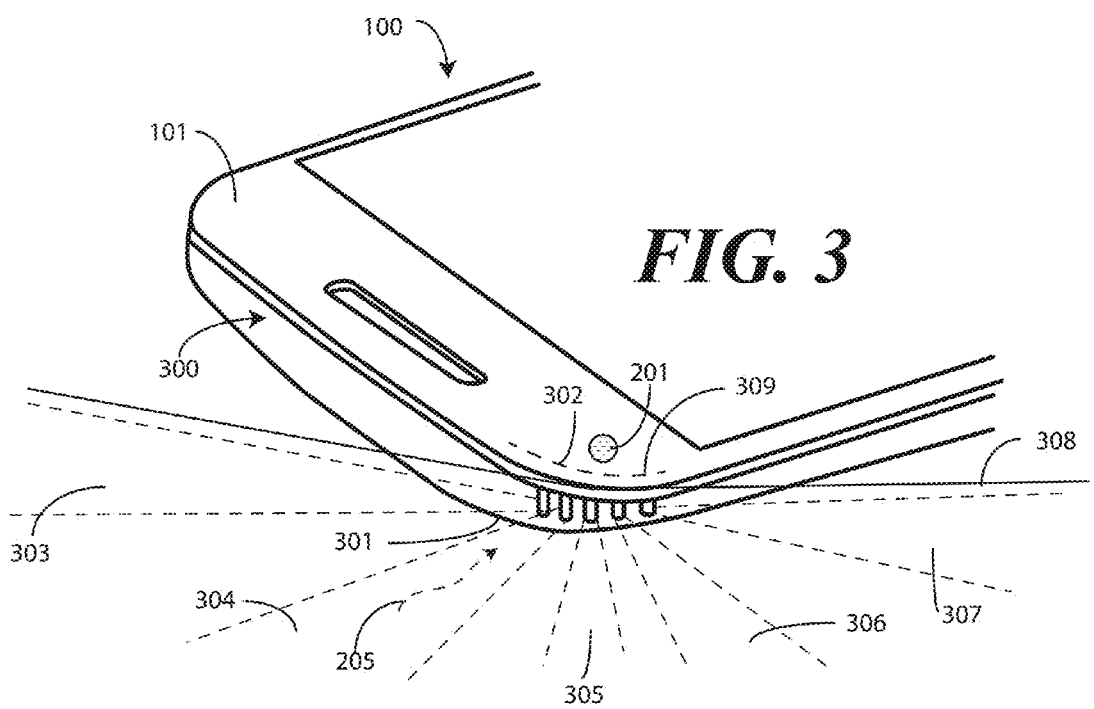
FIG. 3 illustrates one explanatory proximity sensor component configuration in accordance with one or more embodiment of the disclosure.

In one embodiment, the proximity sensor components 201, 202 can include at least two sets of components. For example, a first set of components can be disposed at a first corner of the electronic device 100, while another set of components can be disposed at a second corner of the electronic device 100. As shown in FIG. 3, in one embodiment each proximity sensor component 201 can be disposed about a perimeter 300 of the electronic device 100. In one embodiment, the proximity sensor components 201 are disposed at a corner 301 of the electronic device 100. As will be shown with reference to FIG. 4 below, proximity sensor components can be disposed along the sides of the electronic device 100 as well.

In one embodiment, each proximity sensor component 201 is disposed behind a grille 302 that defines one or more apertures through which infrared emissions 205 are received. In one embodiment, the grille 302 can define one or more reception beams 303, 304, 305, 306, 307 in which infrared emissions 205 can be received. A reception angle 308 is defined by the angular range at which infrared emissions 205 can be received by a particular proximity sensor component 201. In one or more embodiments, to provide 360-degree coverage about the housing 101 of the electronic device 100, the reception angle for each proximity sensor component 201 is obtuse such that it overlaps with at least one other beam reception angle of at least one other proximity sensor component. This will be shown in more detail below with reference to FIG. 5.

The definition of such reception beams advantageously can enable the proximity sensor components 201 to detect not only the location of an object relative to the housing 101, but also whether one or multiple objects are within a thermal detection radius. Embodiments of the disclosure contemplate that there is a high value in not only detecting presence or motion of a user in a 360-degree coverage area provided by the proximity sensor components 201, but also in determining where the exact user position is relative to electronic device 100. The use of the grille 302 and its corresponding reception beams 303, 304, 305, 306, 307 allows for the detection of multiple people about the housing 101 of the electronic device 100, even when those people are close to one another and not just in separate quadrants as in the case of four proximity sensor components (140) as shown in FIG. 1 above. Advantageously, in one or more embodiments this can be accomplished using only four proximity sensor components, which reduces cost and simplifies the overall design. In one embodiment this is accomplished by using the reception beams 303, 304, 305, 306, 307 and overlapping the reception angle 308 where multiple proximity sensor components are used to assess user location via triangulation. This will be described in more detail in the subsequent figures. In one or more embodiments, the proximity sensor components 201 can also detect changes across reception beams to detect motion as well.

The apertures of the grille 302 can be used to define various reception beams 303, 304, 305, 306, 307. In one embodiment, each grille 302 can be associated with a lens 309 disposed behind, outside, or integrally with the grille 302 to assist with the definition of the reception beams and/or serve as a water dust seal. For example, a polycarbonate lens 309 can be disposed behind the grille 302 and configured as a compound Fresnel lens with a predetermined number of slits, such as five or seven, to assist with the definition of the reception beams.

Figure 4:
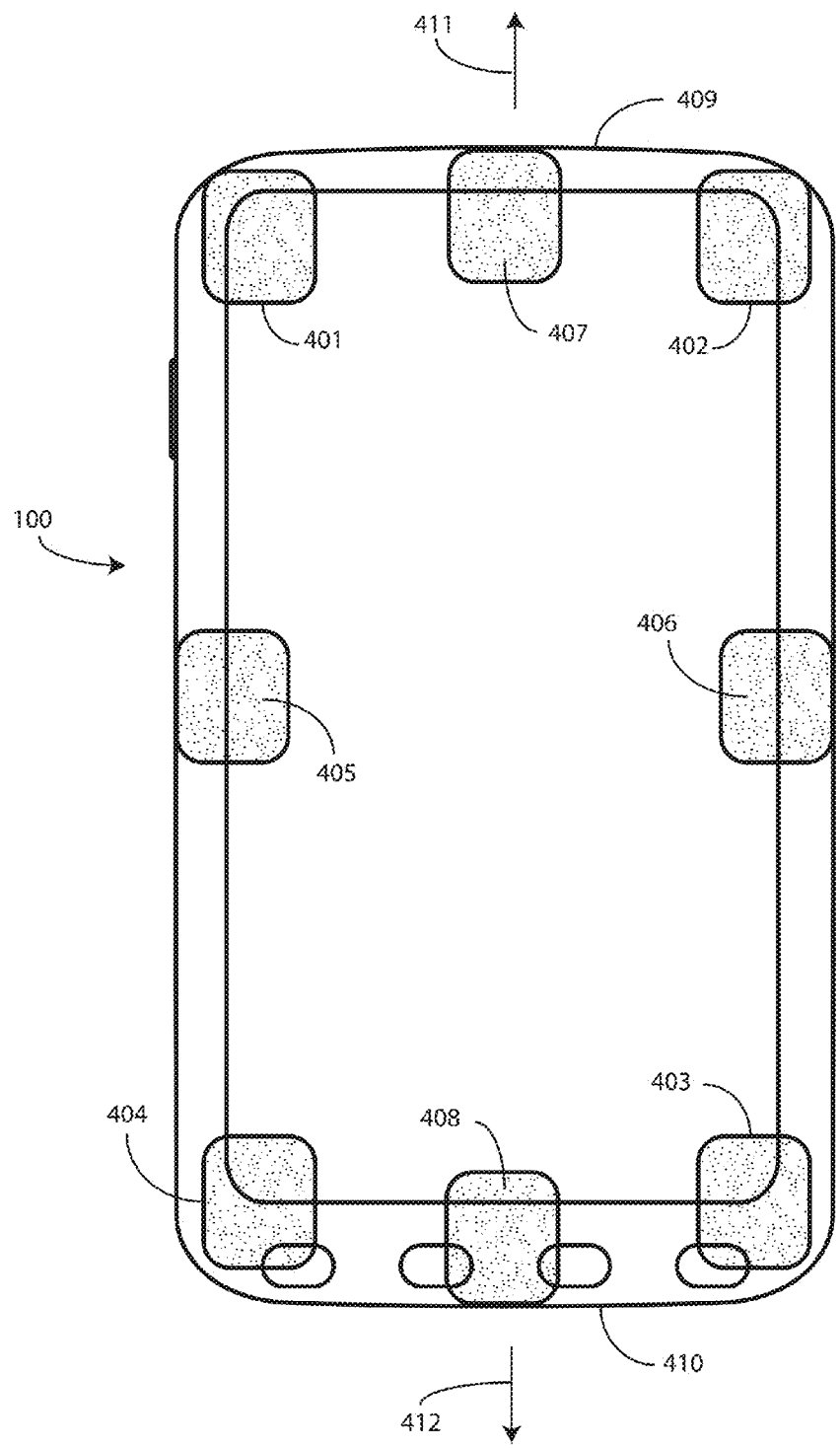
FIG. 4 illustrates explanatory locations along an electronic device where one or more proximity sensor components can be disposed in accordance with one or more embodiments of the disclosure.

It should be noted that corners 301 are not the only location at which proximity sensor components can be located. Turning now to FIG. 4, illustrated therein are some of the many locations at which proximity sensor components may be located. These locations include corner locations 401, 402, 403, 404, edge locations 405, 406, and end locations 407, 408. Other locations and combinations will be obvious to those of ordinary skill in the art having the benefit of this disclosure.

In one or more embodiments, the plurality of proximity sensor components comprises only four proximity sensor components disposed only at the corner locations 401, 402, 403, 404 of the housing 101 on a one-proximity sensor component to one corner location basis, respectively. In one embodiment, two corner locations 401, 402 are disposed at a first end 409 of the electronic device 100, while the two other corner locations 403, 404 are disposed at a second end 410 of the electronic device 100. In this illustrative embodiment, the first end 409 is the top of the electronic device 100, while the second end 410 is the bottom of the electronic device 100. Accordingly, proximity sensor components disposed at the first end 409 will have reception beams directed at least partially in a first direction 411 from the electronic device 100, while the proximity sensor components disposed at the second end 410 will have reception beams directed at least partially in a second direction 412 from the electronic device 100. Where each proximity sensor component includes obtuse, overlapping reception angles (308), a 360-degree coverage about the housing 101 can be achieved using only four proximity sensor components. This is true even where proximity sensor components disposed at the first end 409 have have reception beams directed predominantly along the first direction 411 and the proximity sensor components disposed at the second end 410 will have reception beams directed predominantly a second direction 412 from the electronic device 100.

Figure 18:
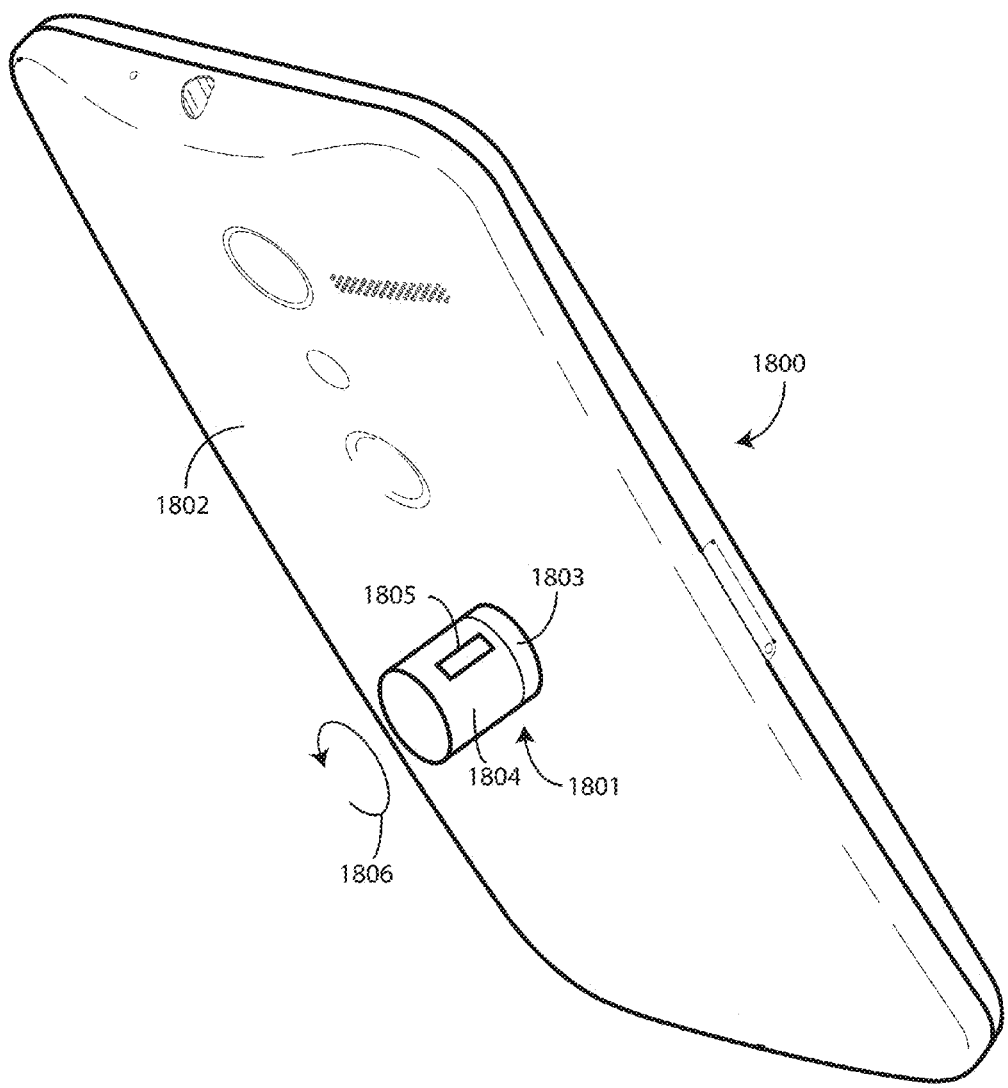
FIGS. 18-20 illustrates an alternate electronic device configured in accordance with one or more embodiments of the disclosure.

While having only four proximity sensor components disposed only at the corner locations 401, 402, 403, 404 of the housing 101 on a one-proximity sensor component to one corner location basis, respectively, is one embodiment, it should be noted that other numbers of proximity sensor components can be used as well. Indeed, as few as one proximity sensor components can be used in one or more embodiments. Turning briefly to FIG. 18, illustrated therein is one such embodiment.

As shown in FIG. 18, an electronic device 1800 includes a turret 1801 extending from a rear side 1802 of the electronic device 1800. In one embodiment, the turret 1801 includes a base member 1803 that is fixedly coupled to the rear side 1802 of the housing. A pivoting member 1804, driven by a motor disposed within the electronic device 1800, can then pivot. A proximity sensor component is disposed along the base member 1803 within the pivoting member 1804 in one embodiment. The pivoting member 1804 functions as a switching device to redirect a reception beam of the one proximity sensor component between being oriented at least partially in a first direction from the housing and being oriented at least partially in a second direction relative to the housing, the second direction different from the first direction.

Figure 19:
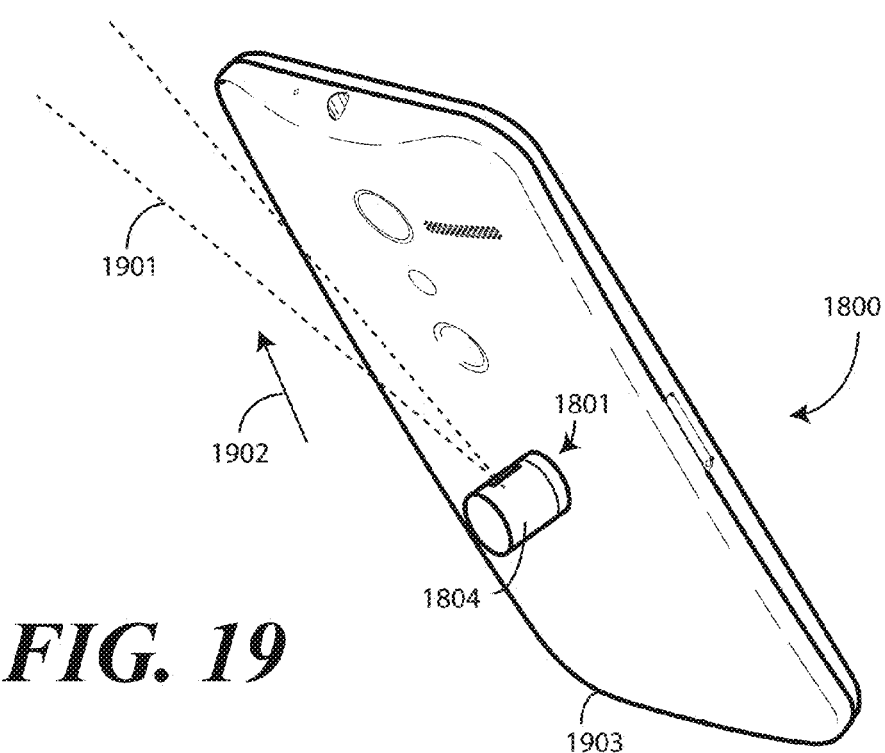
Figure 20:
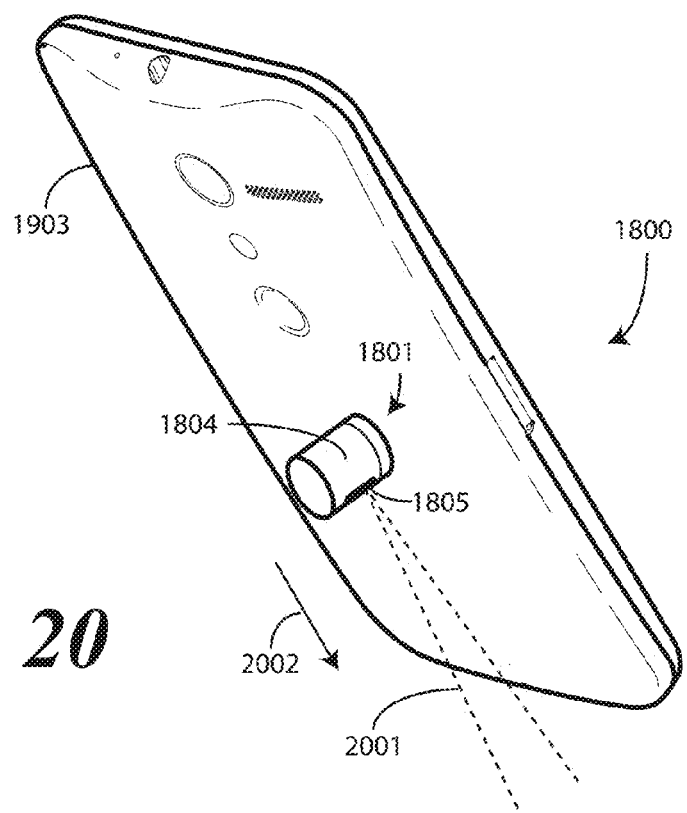

The pivoting member 1804 includes one or more apertures 1805 that function in similar fashion to the apertures of the grille (302) of FIG. 3 in that they can be used to define various reception beams. Moreover, by rotating 1806 the pivoting member 1804, the turret 1801 can be used to alter the direction in which the reception beams are directed. For example, as shown in FIG. 19, the pivoting member 1804 can be rotated to a first position to cause at least a first reception beam 1901 from the single proximity sensor component disposed within the turret 1801 to be oriented at least partially in a first direction 1902 from the housing 1903 of the electronic device 1800. Similarly, as shown in FIG. 20, the pivoting member 1804 can be rotated to a second position to at least a second reception beam 2001 from the single proximity sensor component disposed within the turret 1801 to be oriented at least partially in a second direction 2002 from the housing 1903 of the electronic device 1800.

Accordingly, a single proximity sensor can be used to orient reception beams in two directions. When holding the electronic device 1800, a user can simply allow the turret 1801 to protrude between their fingers. Also, it should be noted that while one aperture 1805 is shown for illustration in FIGS. 18-20, multiple apertures could be disposed along the pivoting member 1804 as well.

Turning now back to FIG. 1, in one embodiment, the one or more processors 116 may generate commands based on information received from one or more proximity sensor components 140. The one or more processors 116 may generate commands based upon information received from a combination of the one or more proximity sensor components 140 and one or more other sensors 109. The one or more processors 116 may process the received information alone or in combination with other data, such as the information stored in the memory 118.

The one or more other sensors 109 may include a microphone, and a mechanical input component such as button or key selection sensors, touch pad sensor, touch screen sensor, capacitive sensor, and switch. Touch sensors may used to indicate whether the device is being touched at side edges, thus indicating whether or not certain orientations or movements are intentional by the user. The other sensors 109 can also include surface/housing capacitive sensors, audio sensors, and video sensors (such as a camera).

The other sensors 109 can also include motion detectors, such as an accelerometer or a gyroscope. For example, an accelerometer may be embedded in the electronic circuitry of the electronic device 100 to show vertical orientation, constant tilt and/or whether the device is stationary.

In one embodiment, the other sensors 109 can further include an intelligent imager 150 that is configured to capture an image of an object and determine whether the object matches a predetermined criteria. For example, the intelligent imager 150 can be operable with an identification module 151 configured with optical recognition such as include image recognition, character recognition, visual recognition, facial recognition, color recognition, shape recognition and the like. Advantageously, the identification module 151 can be used with the intelligent imager 150 as a facial recognition device to determine the identity of one or more persons detected about the electronic device 100. For example, in one embodiment when the one or more proximity sensor components 140 detect a person, the intelligent imager can capture a photograph of that person. The identification module 151 can then compare the image to a reference file stored in memory 118, to confirm beyond a threshold authenticity probability that the person's face sufficiently matches the reference file. Beneficially, optical recognition allows the one or more processors to enter the normal mode of operation only when one of the persons detected about the electronic device 100 are sufficiently identified as the owner of the electronic device.

In other embodiments, the identification module 151 can be operable with an audio input, such as a microphone included with the other sensors 109. Accordingly, the identification module 151 can sample sounds when the one or more proximity sensor components 140 detect a person within a reception radius. The identification module 151 can then compare extracted parametric data from the sampled audio file to a reference file stored in memory 118, to confirm beyond a threshold authenticity probability that the person's voice profile sufficiently matches the reference file. Accordingly, in one or more embodiments the memory 118 can hold identification information that allows the identification module 151 to identify an owner of the electronic device 100 by comparing the extracted parametric data from captured audio information with the reference identification information in a voice identification process. While facial recognition and audio recognition are two possible ways of identifying a user in accordance with one or more embodiments, other identification techniques will be obvious to those of ordinary skill in the art having the benefit of this disclosure. For example, iris scanning devices, fingerprint sensors, other biometric identifiers, and other electronic identification techniques can be used to identify a user can be used instead of facial recognition or voice recognition in other embodiments.

Other components 110 operable with the one or more processors 116 can include output components such as video, audio, and/or mechanical outputs. For example, the output components may include a video output component such as the display 102 or auxiliary devices including a cathode ray tube, liquid crystal display, plasma display, incandescent light, fluorescent light, front or rear projection display, and light emitting diode indicator. Other examples of output components include audio output components such as speaker port 132 or other alarms and/or buzzers and/or a mechanical output component such as vibrating or motion-based mechanisms.

It is to be understood that FIG. 1 is provided for illustrative purposes only and for illustrating components of one electronic device 100 in accordance with embodiments of the disclosure, and is not intended to be a complete schematic diagram of the various components required for an electronic device. Therefore, other electronic devices in accordance with embodiments of the disclosure may include various other components not shown in FIG. 1, or may include a combination of two or more components or a division of a particular component into two or more separate components, and still be within the scope of the present disclosure.

Figure 5:
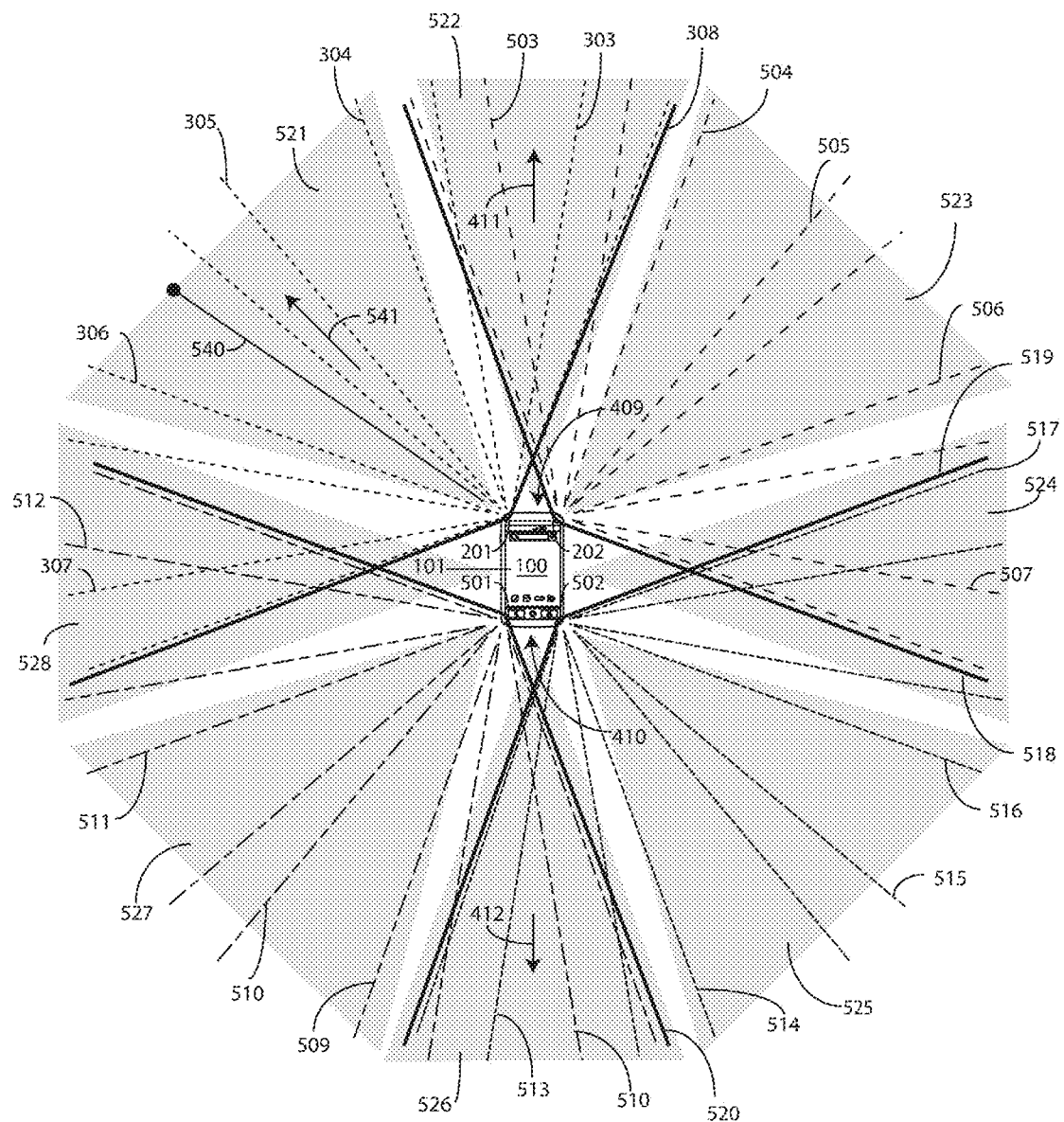
FIG. 5 illustrates an explanatory electronic device having a plurality of proximity sensor components disposed about a perimeter of a device housing, with each proximity sensor component defining one or more reception beams in accordance with one or more embodiments of the disclosure.

Turning now to FIG. 5, illustrated therein is the electronic device 100 having four proximity sensor components 201, 202, 501, 502 disposed at corners of the electronic device 100. Each proximity sensor component 201, 202, 501, 502 is disposed behind a grille (302) defining a plurality of reception beams, each of which forms a "window" through which infrared emissions can be received. In this illustrative embodiment, proximity sensor component 201 defines reception beams 303, 304, 305, 306, 307, while proximity sensor component 202 defines reception beams 503, 504, 505, 506, 507. Similarly, proximity sensor component 501 defines reception beams 508, 509, 510, 511, 512, and proximity sensor component 502 defines reception beams 513, 514, 515, 516, 517.

Each set of reception beams defines a corresponding reception angle. For example, reception beams 303, 304, 305, 306, 307 define reception angle 308, while reception beams 503, 504, 505, 506, 507 define reception angle 518. Similarly, reception beams 508, 509, 510, 511, 512 define reception angle 519, and reception beams 513, 514, 515, 516, 517 define reception angle 520.

As noted above, in one embodiment, the reception angle of any one proximity sensor component overlaps the reception angle of at least one other proximity sensor component. It should be noted that this overlap is not required. In other embodiments overlap is not present. In the illustrative embodiment of FIG. 5, the reception angle of the any one proximity sensor component overlaps the reception angle of at least two other proximity sensor components. Illustrating by example, reception angle 308 overlaps both reception angle 518 and reception angle 520. Similarly, reception angle 519 overlaps both reception angle 518 and reception angle 520.

As noted above, in one or more embodiments at least a first proximity sensor component defines at least a first reception beam oriented at least partially in a first direction 411 from the housing 101 of the electronic device 100, and at least as second proximity sensor component defines at least a second reception beam oriented at least partially in a second direction 412 relative to the housing 101 of the electronic device 100 where the second direction 412 is different from the first direction 411. In the illustrative embodiment of FIG. 5, proximity sensor component 201 defines reception beams 303, 304, 305, 306 that are at least partially oriented in the first direction 411. Similarly, proximity sensor component 202 defines reception beams 503, 504, 505, 506 that are at least partially oriented in the first direction 411. By contrast, proximity sensor component 501 defines reception beams 509, 510, 511, 526 that are at least partially oriented in the second direction 412, while proximity sensor component 502 defines reception beams 513, 514, 515, 516 that at least partially are oriented in the second direction 412.

With this configuration and corresponding proximity sensor component orientation, when a user holds the electronic device 100 with the bottom, i.e., the second end 410, of the electronic device 100, proximity sensor components 501, 502 will detect large infrared emissions from the user, while proximity sensor components 201, 202 will detect very little. By contrast, when another person stands in front of the top, i.e., the first end 409, of the electronic device 100, proximity sensor components 201, 202 will detect this by receiving infrared emissions from the other person.

Accordingly, in one or more embodiments, the one or more processors (116) of the electronic device 100 can be operable to detect, with proximity sensor component 501, proximity sensor component 502, or combinations thereof, can be used to determine that a person is within a thermal reception radius 540 of the electronic device 100 along the second direction 412. Additionally, the one or more processors (116) of the electronic device 100 are further operable to determine, with proximity sensor component 201, proximity sensor component 202, or combinations thereof, whether another person is within the thermal reception radius 540 of the electronic device 100 along the first direction 411. Where only the person is within the thermal reception radius 540, the one or more processors (116) can operate the electronic device 100 in a first mode of operation. Where both the person and the other person are within the thermal reception radius, the one or more processors (116) can operate the electronic device 100 in a second mode of operation.

Note that the overlap of the reception angles 308, 518, 519, 520 defines a number of zones 521, 522, 523, 524, 525, 526, 527, 528 from which infrared emissions can be received. The definition of these zones 521, 522, 523, 524, 525, 526, 527, 528 allows the one or more processors (116) of the electronic device 100 to determine where one or more persons may be located about the electronic device. For example, if a person is standing in zone 521, the only proximity sensor component receiving infrared emissions will be proximity sensor component 201. By contrast, if the person is standing in zone 522, both proximity sensor component 201 and proximity sensor component 202 will receive the infrared emission due to the fact that their respective reception angles 308, 518 overlap. A similar analysis can be applied to each zone 521, 522, 523, 524, 525, 526, 527, 528.

Thus, by determining which proximity sensor component, or combination of components, receives the infrared emission, the one or more processors (116) can determine where a person or persons may be located about the electronic device 100. Said differently, in one embodiment the one or more processors (116) can determine whether a single proximity sensor component or multiple proximity sensor components receives the infrared emission to determine a relative location of either a single person or a plurality of people relative to the housing (101) of the electronic device 100.

Since the one or more processors (116) can determine location using the zones 521, 522, 523, 524, 525, 526, 527, 528, it should be understood that the one or more processors can also detect motion as an object moves between zones 521, 522, 523, 524, 525, 526, 527, 528. For example, the one or more processors (116) can infer movement by initially receiving infrared emissions in a first zone, e.g., zone 521, and then determining that the emission is subsequently received in a second zone, e.g., zone 522. Additionally, in one or more embodiments the one or more processors (116) can detect a rate of change of the magnitude of any infrared emission received in any zone 521, 522, 523, 524, 525, 526, 527, 528 as well.

Using these zones 521, 522, 523, 524, 525, 526, 527, 528, the one or more processors (116) can determine whether a person other than the user is within the thermal reception radius 540 along different directions so as to cause the electronic device 100 to enter a privacy mode. While the first direction 411 and the second direction 412 are opposite directions corresponding to zone 522 and zone 526, respectively, any of the other zones 521, 523, 524, 525, 527, 528 could be used to determine another person was present as well. For example, the one or more processors (116) may detect a user along the second direction 412, while determining that another person is within the thermal reception radius 540 along a third direction 541 using zone 521. Other directions can be defined using the remaining zones 523, 524, 525, 527, 528. Accordingly, the different directions at which the other person is located relative to the user can take any number of angles as defined by the various zones 521, 522, 523, 524, 525, 526, 527, 528.

Figure 6:
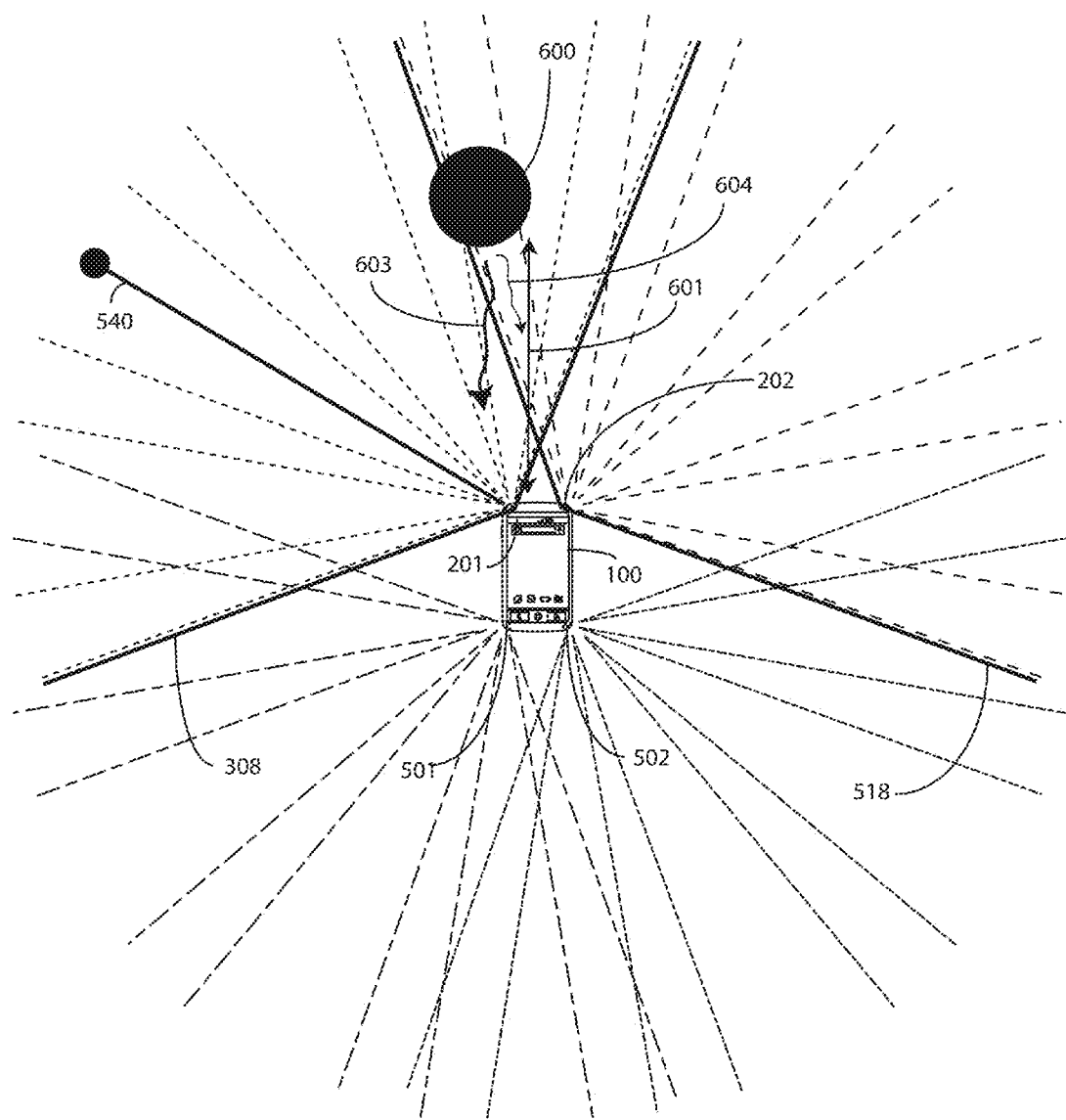
FIG. 6 illustrates one explanatory method of determining object location with one or more proximity sensors in accordance with one or more embodiments of the disclosure.

Turning now to FIG. 6, by detecting the strength of infrared emissions (for stationary person or moving person), the one or more processors (116) can determine one or more of the distance 601 a person may be from the electronic device 100 and/or a more precise location of that person. As shown in FIG. 6, a single person 600 is within a thermal reception radius 540 of the electronic device 100. The single person 600 is standing within both reception angle 308 and reception angle 518. However, the person 600 is located more centrally within, i.e., inside and more to the center of, reception angle 308 than reception angle 518, where the user is right at the edge. Accordingly, infrared emissions 603 received by proximity sensor component 201 will be stronger than infrared emissions 604 received by proximity sensor component 202. Using this information, the one or more processors (116) can determine more precisely the location of the person 600. Additionally, the strength of the infrared emissions 603, 604 can be used to determine the distance 601 the person 600 is from the electronic device 100 as well.

Figure 7:
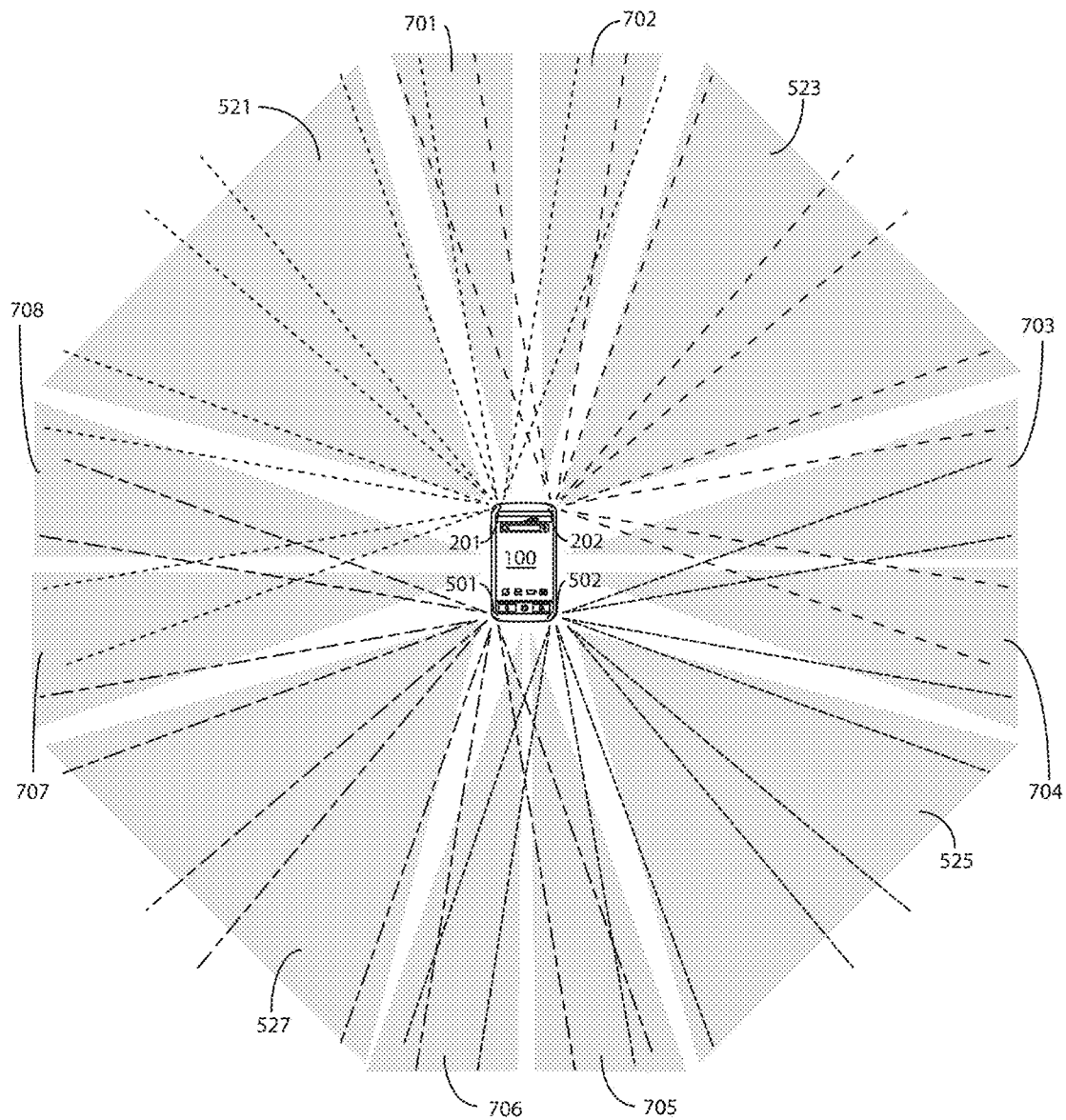
FIG. 7 illustrates another explanatory electronic device having a plurality of proximity sensor components disposed about a perimeter of a device housing, with each proximity sensor component defining a plurality of reception beams in accordance with one or more embodiments of the disclosure.

As shown in FIG. 7, this optional signal strength measurement can be used to create four additional zones. In FIG. 7, zones 521, 523, 525, 527 all stay the same, i.e., occur where only a single proximity sensor component 201, 202, 501, 502 receives an infrared emission. However, previous zones (522, 524, 526, 528) have been divided into zones 701, 702, 703, 704, 705, 706, 707, 708 in which one proximity sensor component receives a stronger signal than the other. For example, zone 701 occurs for the situation described above with reference to FIG. 6, namely where infrared emissions (603) received by proximity sensor component 201 are stronger than infrared emissions (604) received by proximity sensor component 202. Zone 702 is the corollary of this case, namely where infrared emissions received by proximity sensor component 201 are weaker than those received by proximity sensor component 202. A similar analysis can be applied to each zone 521, 523, 525, 527, 701, 702, 703, 704, 705, 706, 707, 708. This configuration increases the different directions at which the person can be located relative to the electronic device 100 or the user. Thus, by determining which proximity sensor component receives the infrared emission, or where two proximity sensor components receive an emission which one receives the stronger emission, the one or more processors (116) can determine more precisely where a person or persons may be located about the electronic device 100.

Distance from the electronic device 100 device can be determined from the magnitude of the received emission as well. In one or more embodiments, the one or more processors (116) of the electronic device 100 are operable to determine a magnitude of the infrared emission to determine a distance (601) of a single person or a plurality of people relative to the housing (101) of the electronic device 100.

Figure 8:
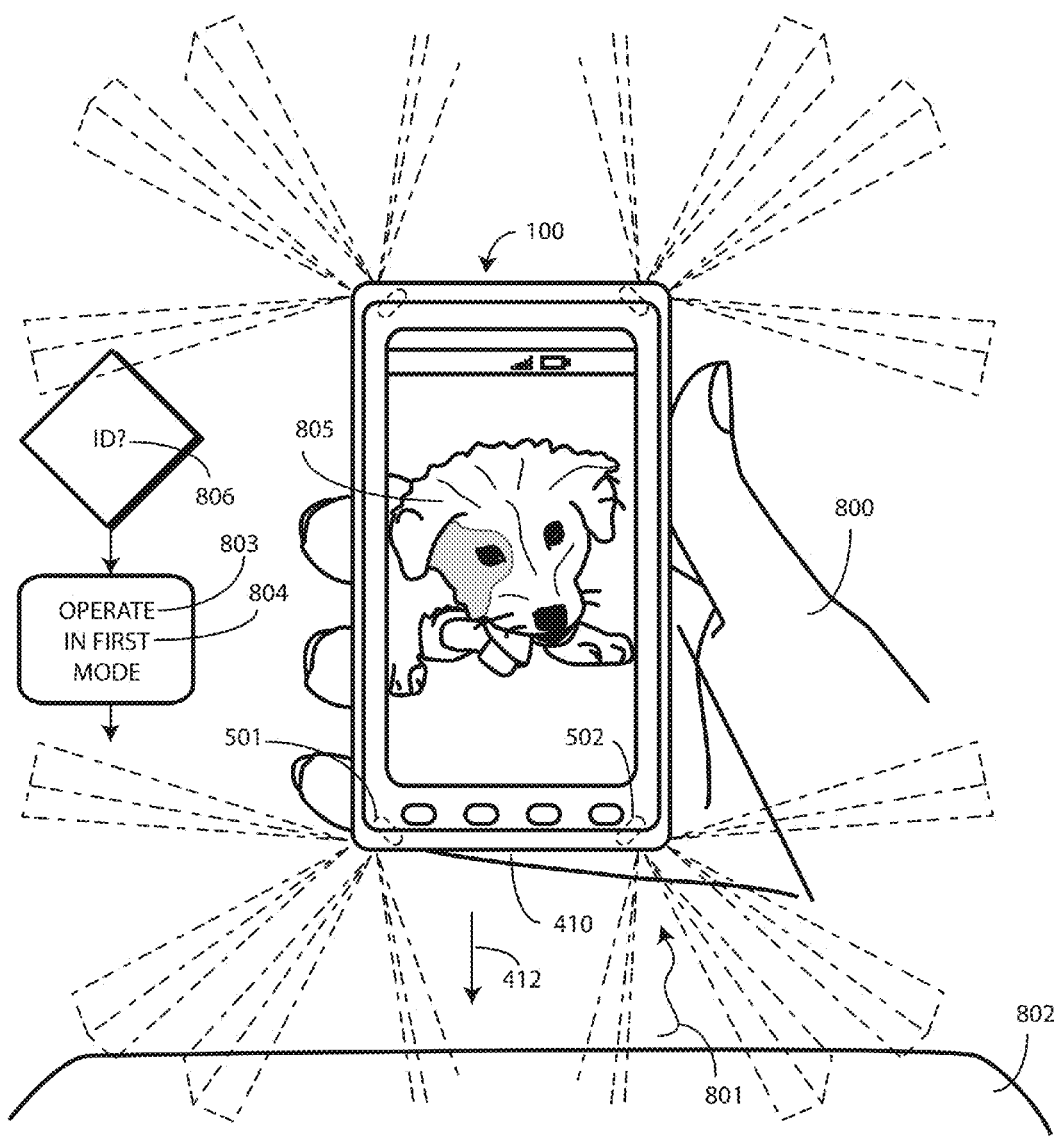
FIG. 8 illustrates one explanatory electronic device operating in a first mode of operation in accordance with one or more embodiments of the disclosure.
Figure 9:
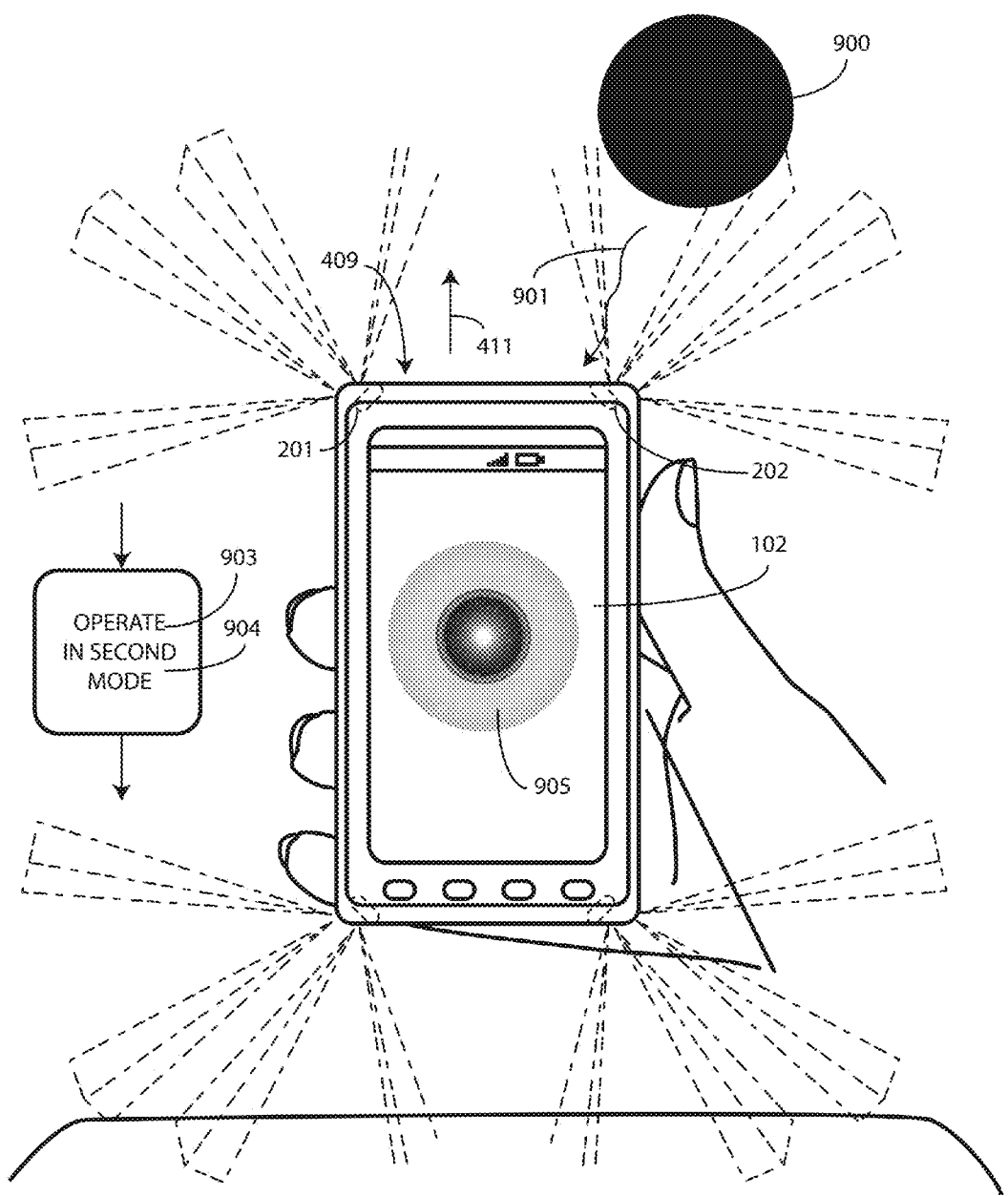
FIG. 9 illustrates one explanatory electronic device operating in a second mode of operation in accordance with one or more embodiments of the disclosure.

Explanatory use cases to illustrate the operation of the electronic device 100 are shown generally in FIGS. 8-9, with additional features shown in FIGS. 10-12 and 16-17. Turning now to FIG. 8, as shown a user 800 is holding the electronic device 100 toward the second end 410 and is standing along the second direction 412 relative to the electronic device 100. Accordingly, proximity sensor components 501, 502 receive infrared emissions 801 from the user's body 802 along the second direction 412. Since the user 800 is the only person within the thermal reception radius (540), the one or more processors (116) of the electronic device 100 operate 803 the electronic device 100 in the first mode 804 of operation. In one embodiment the normal mode of operation is one in which no restrictions are placed upon access to information from the electronic device 100. In this embodiment, the first mode 804 of operation is a normal mode of operation. Accordingly, the user 800 has free access to the information in the electronic device 100, as evidenced by the fact that the user 800 is looking at a picture 805 of their dog, B-man.

In one or more embodiments, the one or more processors (116) can optionally attempt to identify 806 the user 800 prior to entering the first mode 804 of operation. Recall from above that in one embodiment the electronic device 100 can include an intelligent imager (150) configured to capture an image of an object and determine whether the object matches predetermined criteria. The intelligent imager can include an identification module (151) having optical recognition such as include image recognition, character recognition, visual recognition, facial recognition, color recognition, shape recognition and the like. Alternatively, the electronic device can have an identification module (151) operable with an audio input, such as a microphone included with the other sensors 109. Where this is the case, the one or more processors (116) can optionally attempt to identify the user 800 using one of these techniques prior to entering the first mode 804 of operation.

Turning now to FIG. 9, another person 900 has entered the thermal reception radius (540). The other person 900 emits infrared emissions 901 to the proximity sensor components 201, 202 disposed at the first end 409 of the electronic device 100. Since the other person 900 is within the thermal reception radius (540), the one or more processors (116) of the electronic device 100 operate 903 the electronic device 100 in a second mode 904 of operation. In this embodiment, the second mode 904 of operation is a mode of operation. In one embodiment the privacy mode 1003 of operation is one in which one or more restrictions are placed upon access to information from the electronic device 100. Accordingly, the picture (805) of B-man has bee replaced by a non-descript screen saver 905. The other person 900 is therefore unable to eavesdrop into the user's photo collection or other information.

Advantageously, one or more embodiments of the disclosure conveniently cause the electronic device 100 to enter the privacy mode without drawing attention to the user 800, and without requiring the user to delivering any touch input or voice input. Accordingly, the user 800 is assured that the other person 900 will not hear or see private information, such as medical diagnosis, breakup messages, or other sensitive information or any information the user previously labeled as private or sensitive. As noted above, these restrictions are only explanatory examples. Others will be readily obvious to those of ordinary skill in the art having the benefit of this disclosure.

In one or more embodiments, the information access restrictions applied in the privacy mode of operation are user definable. For example, a user 800 may desire the ability to read private information to be OFF when the other person 900 is within the thermal reception radius (540), while desiring the ability to show pictures to the other person 900 to be ON. Similarly, the user 800 may want the presentation of private information to be precluded, while allowing the presentation of public information. For example, the user 800 may want to preclude the presentation of a text message sent from a friend, while allowing the presentation of a publicly available stock quote. In yet another embodiment, the user 800 may want some information to be presented on certain portions of the display 102, while precluding the presentation of information on portions of the display 102 visible to the other person 900. The one or more processors (116) may therefore present information on some portions of the display 102 while leaving other portions blank. Such an embodiment is useful for privacy modes of operation when the user 800 wants information to be present only on portions of the electronic device 100 oriented towards or facing them. In still other embodiments, operation in the privacy mode may simply require an additional factor of authentication. One example of this may be simply challenge the authentication of the user by using biometrics or wireless authentication or some other automatic technique. Other configurations will be obvious to those of ordinary skill in the art having the benefit of this disclosure.

In one or more embodiments, as noted below with reference to FIG. 13, the proximity sensor components can be used to determine distance. Where, for example, another person is present as detected by the proximity sensor component, the electronic device can determine a distance from the electronic device at which the other person is located. In one or more embodiments, the privacy mode is not actuated until the other person comes within a predefined distance of the electronic device, such as five feet. Thus, the electronic device might continue to operate in the normal mode until the other person is closer.

Figure 10:
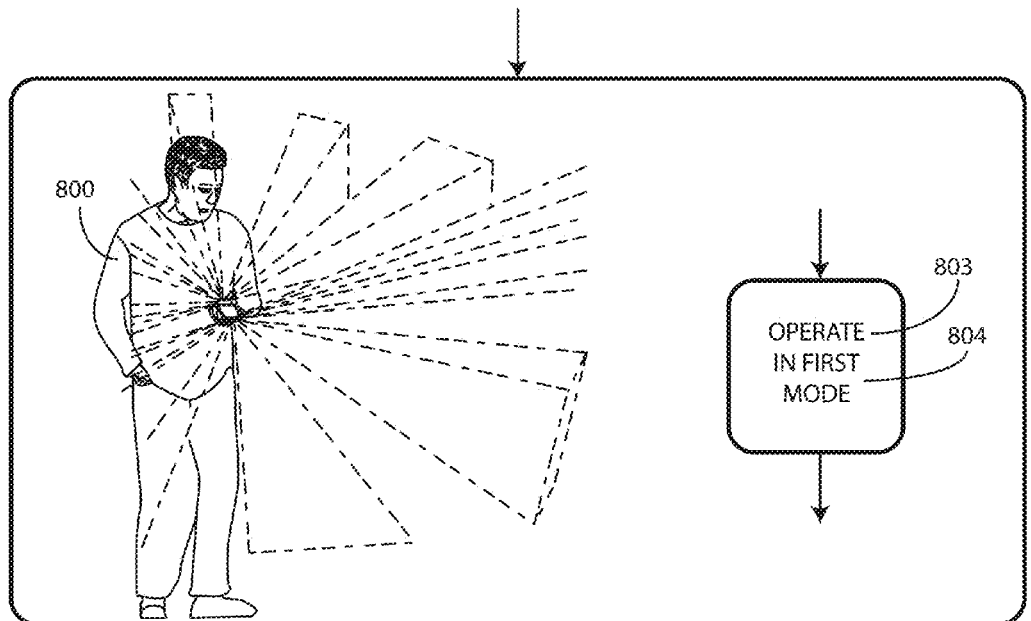
FIG. 10 illustrates one or more steps of one explanatory method in accordance with one or more embodiments of the disclosure.
Figure 11:
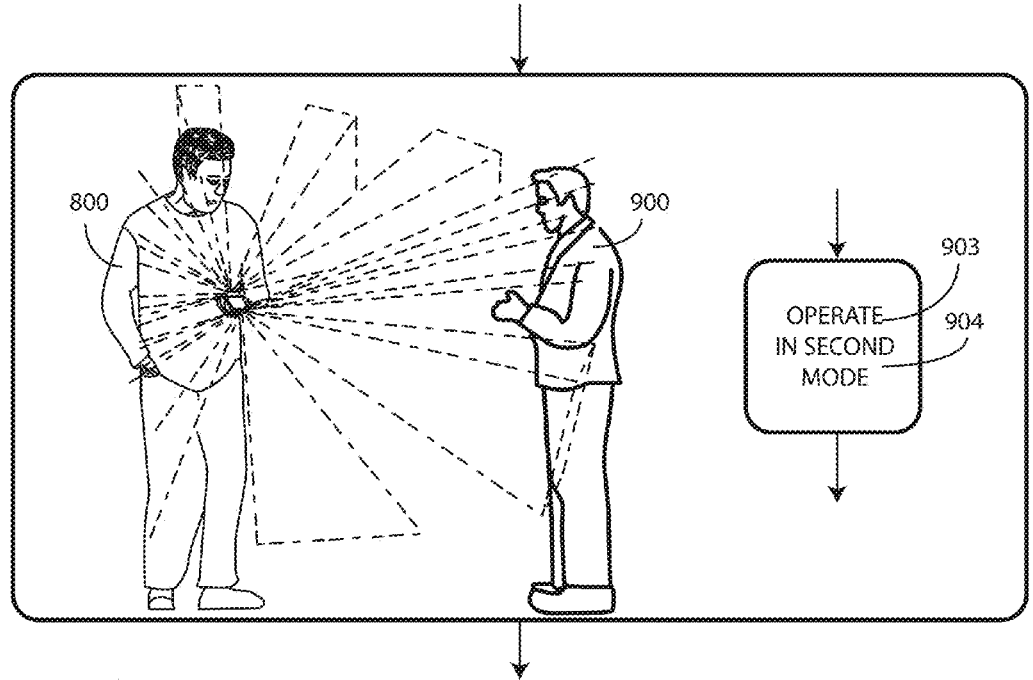
FIG. 11 illustrates one or more steps of one explanatory method in accordance with one or more embodiments of the disclosure.

Turning to FIGS. 10 and 11, the general operation of an electronic device 100 is summarized. Beginning with FIG. 10, only the user 800 is within the thermal reception radius (540). When this occurs, the one or more processors (116) are operable to detect that the user 800 is within the thermal reception radius (540) along a first direction using a subset of the four proximity sensor components (201, 202, 501, 502). Accordingly, the one or more processors (116) can operate 803 the electronic device 100 in a first mode 804 of operation.

In one or more embodiments, the one or more processors (116) can optionally attempt to identify (805) the user 800 prior to entering the first mode 804 of operation using an intelligent imager (150) configured to capture an image of an object and determine whether the object matches predetermined criteria. The intelligent imager can include an identification module (151) having optical recognition such as include image recognition, character recognition, visual recognition, facial recognition, color recognition, shape recognition and the like. Alternatively, the electronic device can have an identification module (151) operable with an audio input, such as a microphone included with the other sensors 109. Where this is the case, the one or more processors (116) can optionally attempt to identify the user 800 using one of these techniques prior to entering the first mode 804 of operation.

By contrast, as shown in FIG. 11, both the user 800 and the other person 900 are within the thermal reception radius (540). Another subset of the four proximity sensor components (201, 202, 501, 502) determines that the other person 900 is within the thermal reception radius (540) along a second direction. Accordingly, the one or more processors (116) can operate 903 the electronic device 100 in a second mode 904 of operation that is different from the first mode (804) of operation.

Figure 12:
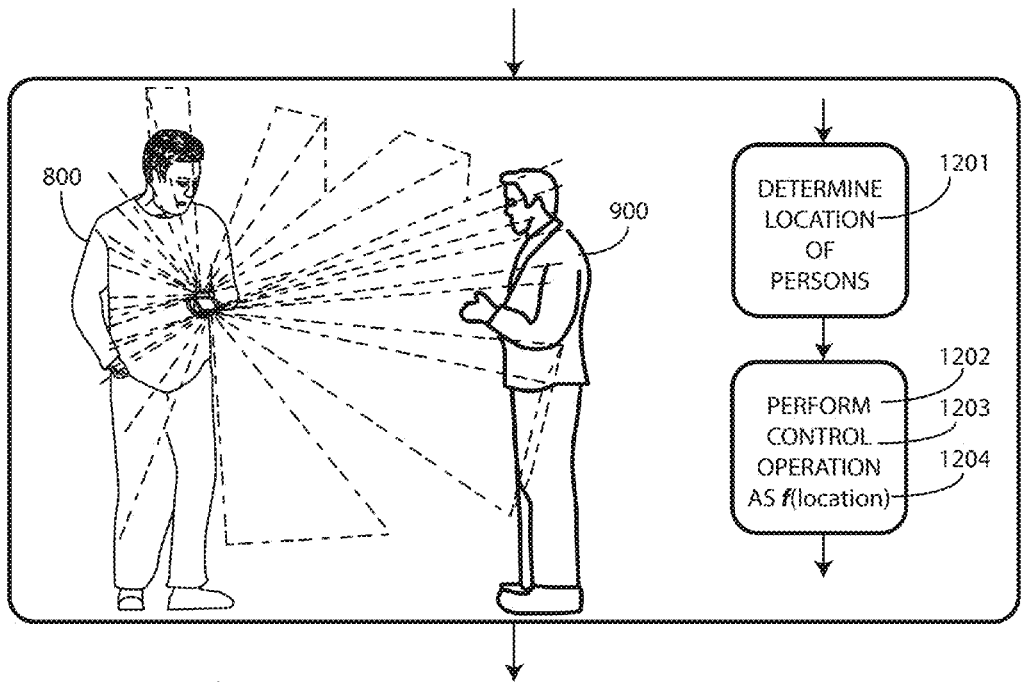
FIG. 12 illustrates one or more steps of one explanatory method in accordance with one or more embodiments of the disclosure.

Other functions can be performed as well. Turning to FIG. 12, when the user 800 and the other person 900 are within the thermal reception radius (540), in one embodiment the one or more processors (116) are operable to determine a location 1201 of user 800 and/or the other person 900 relative to the housing (101) of the electronic device 100 by the different directions detected with the different subsets of proximity sensor components (201, 202, 501, 502) as described above with reference to FIGS. 6-7. In one or more embodiments, the one or more processors (116) can then execute 1202 a control operation 1203 as a function 1204 of the location 1201.

For example, the control operation 1203 may be a security operation that precludes the presentation of at least some information on the display (102) of the electronic device 100. Other security operations include presenting an alert of incoming messages on the display (102), while precluding the content of messages from being presented on the display (102), disabling the presentation of some or all text messages or chat messages, locking the display (102), allowing access to non-sensitive information while precluding access to sensitive or private information, overriding location sensors and beacons, presenting message and electronic mail subjects only on the display (102) while preventing the presentation of message or electronic mail content, or transitioning a voice control interface engine operating in the electronic device 100 between a normal mode of operation and a discrete mode of operation. The examples above of security operations are illustrative only. Others will be readily obvious to those of ordinary skill in the art having the benefit of this disclosure.

Figure 13:
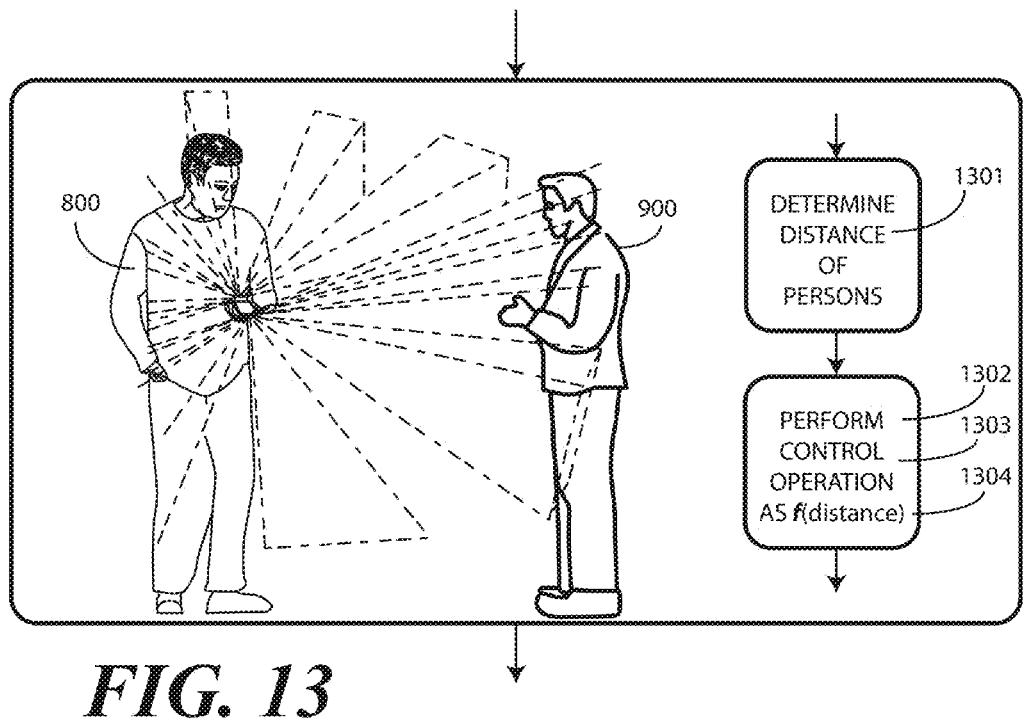
FIG. 13 illustrates one or more steps of one explanatory method in accordance with one or more embodiments of the disclosure.

Turning now to FIG. 13, in one embodiment when the user 800 and the other person 900 are within the thermal reception radius (540), the one or more processors (116) are operable to determine a distance 1301 of other person 900 of people relative to the housing (101) of the electronic device 100. In one or more embodiments, the one or more processors (116) can then execute 1302 a control operation 1303 as a function 1304 of the distance 1301. Examples of possible control operations 1303 were listed in the preceding paragraph. Still others will be obvious to those of ordinary skill having the benefit of this disclosure.

While a normal mode and a privacy mode are two illustrative modes of operation in accordance with one or more embodiments of the disclosure, other modes can be used as well. For example, in another embodiment an electronic device can function in a quasi-private mode. In the quasi-private mode, an electronic device can be configured, when detecting multiple people within the thermal reception radius and identifying one of the people as the user, the one or more processors of the electronic device can be configured to initially enter privacy mode, but to instantly or partially transition toward normal mode operation after interacting with the user. This method is illustrated generally in FIGS. 21 and 22.

Figure 21:
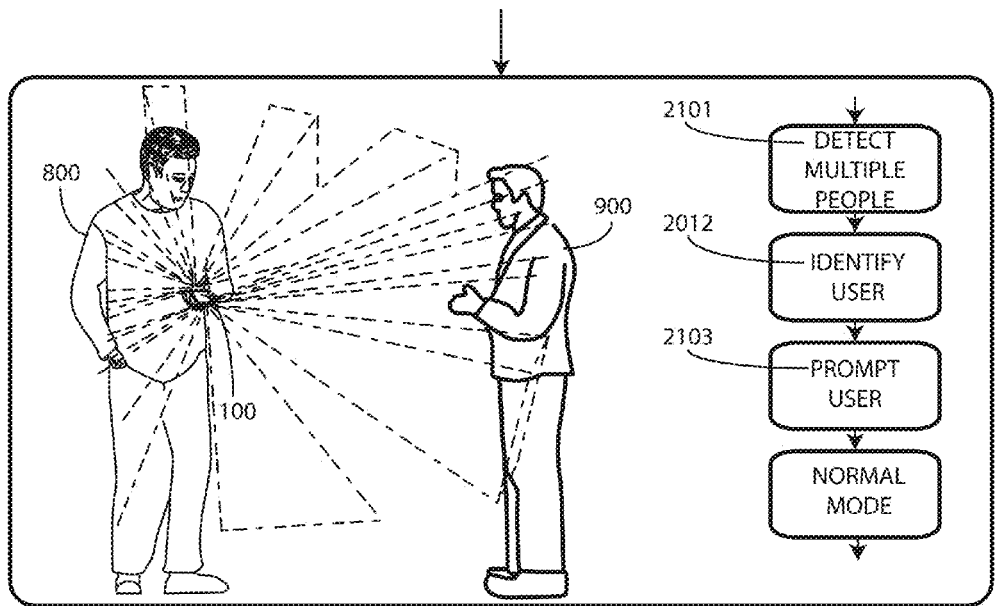
FIG. 21 illustrates one or more steps of one explanatory method in accordance with one or more embodiments of the disclosure.

Turning now to FIG. 21, the one or more processors (116) are operable to detect that the user 800 is within the thermal reception radius (540) along a first direction using a subset of the four proximity sensor components (201, 202, 501, 502). However, another subset of the four proximity sensor components (201, 202, 501, 502) determines that another person 900 is within the thermal reception radius (540) along a second direction. In one embodiment where this occurs, the one or more processors (116) can operate the electronic device 100 in a third mode of operation, which is a quasi-private mode of operation.

In the quasi-private mode of operation, the electronic device 100 is initially in a privacy mode, but begins to move into, or toward, the normal mode of operation after interacting with the user 800. Illustrating by example, presume the user 800 and the other person 900 are in conducting a meeting. In one embodiment, the one or more processors (116) detect 2101 that multiple people are within a thermal reception radius (540) of the electronic device 100. Accordingly, the electronic device 100 is initially placed into privacy mode.

The one or more processors (116) the attempt to identify 2102 the user 800. As noted above, this can be done using an intelligent imager (150) configured to capture an image of an object and determine whether the object matches predetermined criteria. The intelligent imager can include an identification module (151) having optical recognition such as include image recognition, character recognition, visual recognition, facial recognition, color recognition, shape recognition and the like. Alternatively, the electronic device can have an identification module (151) operable with an audio input, such as a microphone included with the other sensors 109.

Where the user is identified, the one or more processors (116) can then prompt 2103 the user 800. For example, the one or more processors (116) may cause an audible message saying, "Excuse me, you have a text message" to be annunciated through a loudspeaker. If the user 800 believes that they are in a safe place, they may respond by saying, "Read it." Accordingly, the one or more processors (116) can transition into the normal mode of operation. In one or more embodiments, this transition is transitory in that the process of FIG. 21 recurs with each incoming message or information. Accordingly, the user 800 has the opportunity to decline having the next message read aloud, while allowing a third message to be read, and so forth.

In one or more embodiments, rather than reading an entire message, portions of content can be delivered in succession after successive interactions with the user. This is shown generally in FIG. 22.

Figure 22:
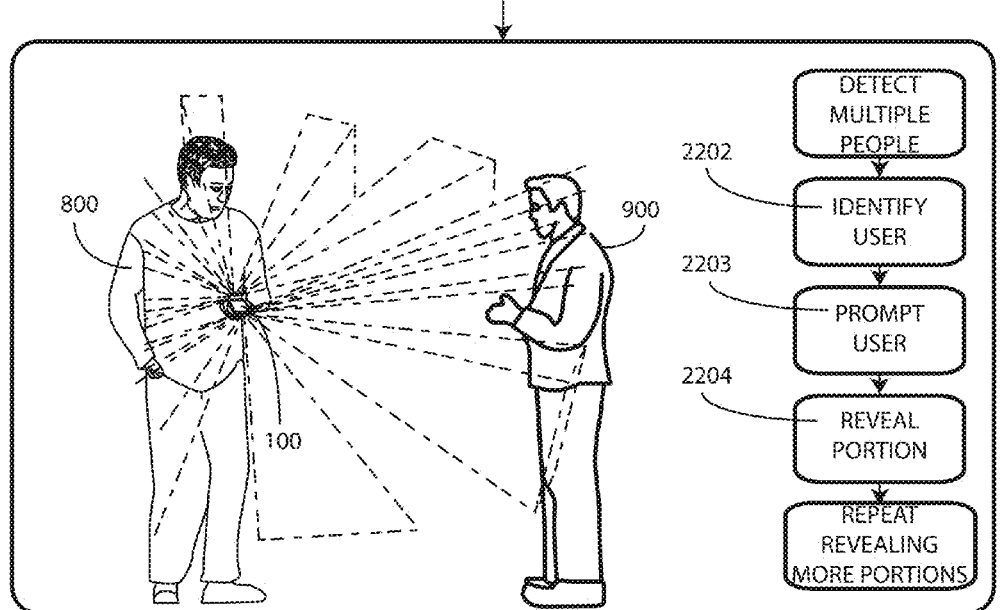
FIG. 22 illustrates one or more steps of one explanatory method in accordance with one or more embodiments of the disclosure.

Turning now to FIG. 22, the one or more processors (116) are operable to detect that the user 800 is within the thermal reception radius (540) along a first direction using a subset of the four proximity sensor components (201, 202, 501, 502). However, another subset of the four proximity sensor components (201, 202, 501, 502) determines that another person 900 is within the thermal reception radius (540) along a second direction. The one or more processors (116) the attempt to identify 2202 the user 800.

Where the user is identified, the one or more processors (116) can then prompt 2203 the user 800. For example, the one or more processors (116) may cause an audible message saying, "Excuse me, you have a text message" to be annunciated through a loudspeaker. Rather than causing all information to be delivered as was the case in FIG. 21, the user 800 might respond by saying, "Who's it from?" When this occurs, the one or more processors (116) might reveal 2204 a portion of the information, such as stating, "Bob." The process can then repeat, with each interaction revealing another portion of information. The user 800 might say, "What's this regarding?" The one or more processors (116) may then reveal a second portion of information by saying, "Lunch." The user 800 may then say, "Read it." Alternatively, the user 800 may want the process to continue by commanding another portion of information, such as by stating, "Lunch when?" This serial prompt-user response-reveal a portion of information process allows the electronic device 100 to serve as a virtual personal assistant who is sensitive to the fact that the user 800 may not want all of the information from a message, voicemail, or other received data to be revealed in front of the other person 900.

Figure 14:
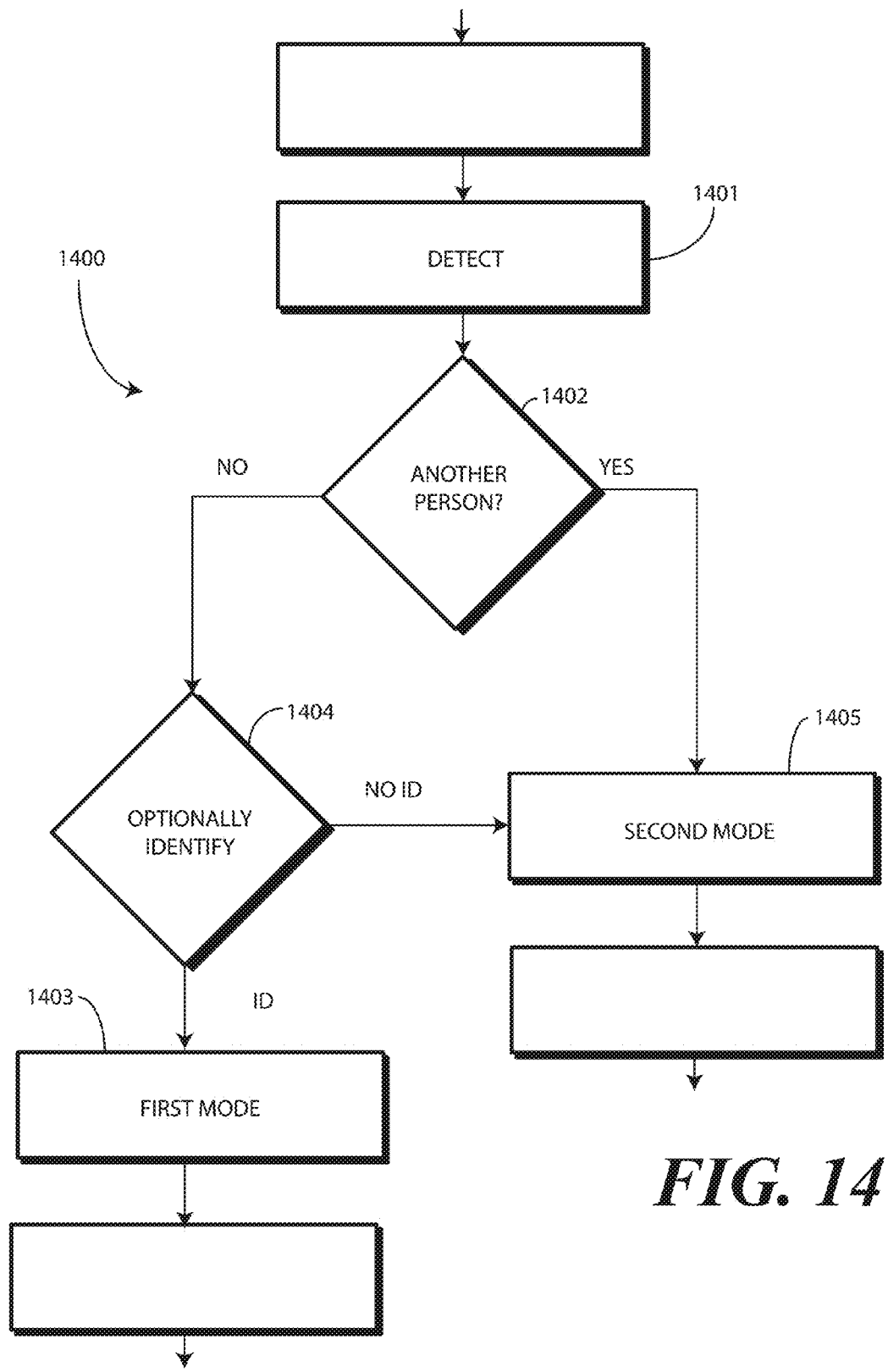
FIG. 14 illustrates one explanatory method in accordance with one or more embodiments of the disclosure.

Turning now to FIG. 14, illustrated therein is one explanatory method 1400 for controlling an electronic device having one or more proximity sensor components and one or more processors operable with the one or more proximity sensor components. Many of the method steps have been described above with reference to the apparatus and system components, and thus will only be described briefly here.

At step 1401, the method 1400 detects, with a plurality of proximity sensor components, a first person is within a thermal reception radius of the electronic device along a first direction from the electronic device. In one embodiment, this step 1401 occurs when two proximity sensor components defining reception beams oriented at least partially in the first direction detect the presence of a person from received infrared emissions from the person.

At decision 1402, where the first person is within the thermal reception radius, the method 1400 determines whether a second person is within the thermal reception radius along a second direction from the electronic device. In one embodiment, the second direction is different than the first direction of step 1401. For example, the second direction can be opposite the first direction, orthogonal to the first direction, at an acute angle relative to the first direction, or at an obtuse angle relative to the first direction. In one embodiment, the second person is detected using two additional proximity sensor components defining reception beams oriented at least partially in the second direction.

At step 1403, where only the single person is within the thermal reception radius, the method 1400 can perform a control operation to operate the device in a normal mode of operation. At optional decision 1404, the method 1400 can attempt to identify the person. In one optional embodiment, the method 1400 may perform the control operation only where the first person is identified.

At step 1405, where a second person is also within the thermal reception radius, the method 1400 can perform another control operation to operate the electronic device in a privacy mode. As previously described, the privacy mode can take one or many forms. In one embodiment, the privacy mode of operation comprises precluding presentation of messages on a display of the electronic device. In another embodiment, the privacy mode of operation comprises presenting only a portion of messages on a display of the electronic device. In another embodiment, the privacy mode of operation comprises locking a display of the electronic device. In another embodiment, the privacy mode of operation comprises requiring user entry of personal identification indicia. In still another embodiment, the privacy mode of operation comprises reducing a volume of an audio output device. Of course, combinations of these approaches can be used. Still others will be obvious to those of ordinary skill in the art having the benefit of this disclosure.

To this point, embodiments of the disclosure have been directed to identifying a single person within a thermal reception radius to operate an electronic device in a first mode, which can be a normal mode, of operation. When multiple people are detected, especially along different directions, the electronic device can be operated in a second mode, which can be a privacy mode of operation. It should be noted that embodiments of the disclosure are not so limited. There are numerous other features that can be accomplished by employing "top end" or "front looking"

proximity sensor components along with "bottom end" or "rear looking" proximity sensor components. One method illustrating such a feature is shown in FIG. 15.

Figure 15:
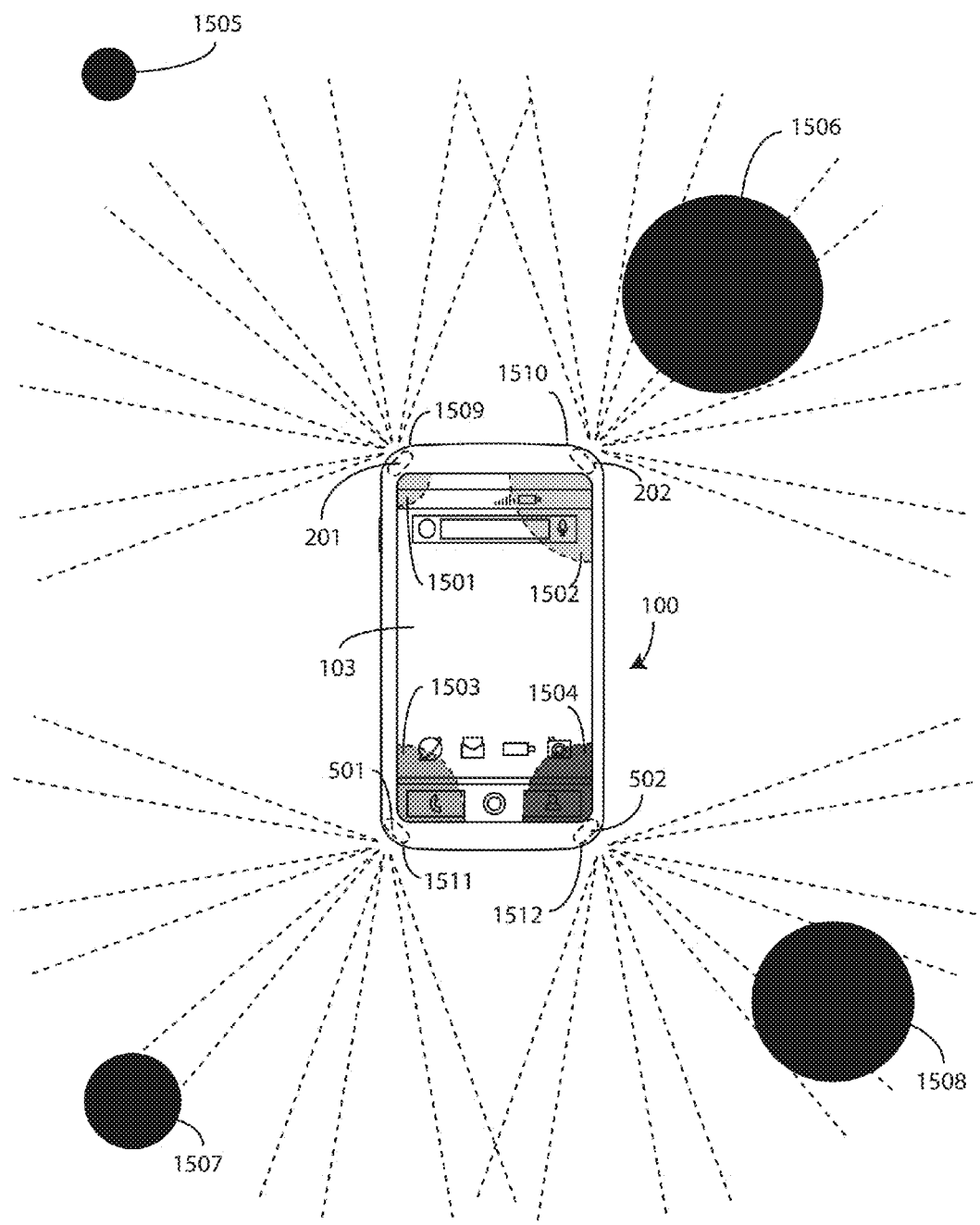
FIG. 15 illustrates another explanatory electronic device in accordance with one or more embodiments of the disclosure.

Turning now to FIG. 15, an electronic device 100 is shown with four proximity sensor components 201, 202, 501, 502. The proximity sensor components 201, 202, 501, 502 detect when a first person is within a thermal reception radius of the electronic device 100 along a first direction from the electronic device. The proximity sensor components 201, 202, 501, 502 can also detect when a second person is within the thermal reception radius along a second direction that is different from the first direction.

The electronic device 100 of FIG. 15 is equipped with an application that is configured to present an indication 1501, 1502, 1503, 1504 on the display 102 when a second person is within the thermal reception radius. To illustrate how this can occur, four people 1505, 1506, 1507, 1508 are shown in FIG. 15. Each is a different distance from the electronic device 100, and is located at a different corner 1509, 1510, 1511, 1512. The proximity sensor components 201, 202, 203, 204 detect the relative locations and/or distances of the four people 1505, 1506, 1507, 1508 and present indications 1501, 1502, 1503, 1504 of the four people 1505, 1506, 1507, 1508 on the display 102.

In one embodiment, each indication 1501, 1502, 1503, 1504 differs so as to indicate to which corner 1509, 1510, 1511, 1512 the four people 1505, 1506, 1507, 1508 are closest. In this embodiment, the indications 1501, 1502, 1503, 1504 also show how close the four people 1505, 1506, 1507, 1508 are to the electronic device 100.

For example, note that indication 1502 is larger than indication 1501. This is due to the fact that person 1506 is closer to the electronic device 100 than person 1505. Other techniques can be used as well. Indications 1503, 1504 are the same size. However, indication 1504 is darker than indication 1503 because person 1508 is closer to the electronic device 100 than person 1507. Note also that the indications 1501, 1502, 1503, 1504 are each presented on the display 102 in a corner corresponding to where the four people 1505, 1506, 1507, 1508 are standing, respectively. Thus, if person 1506 moved closer to corner 1509, its corresponding indication 1502 might move as well. Advantageously, this application can be used for navigation and other purposes. An illustrative use case is provided in FIGS. 16-17.

Figure 16:
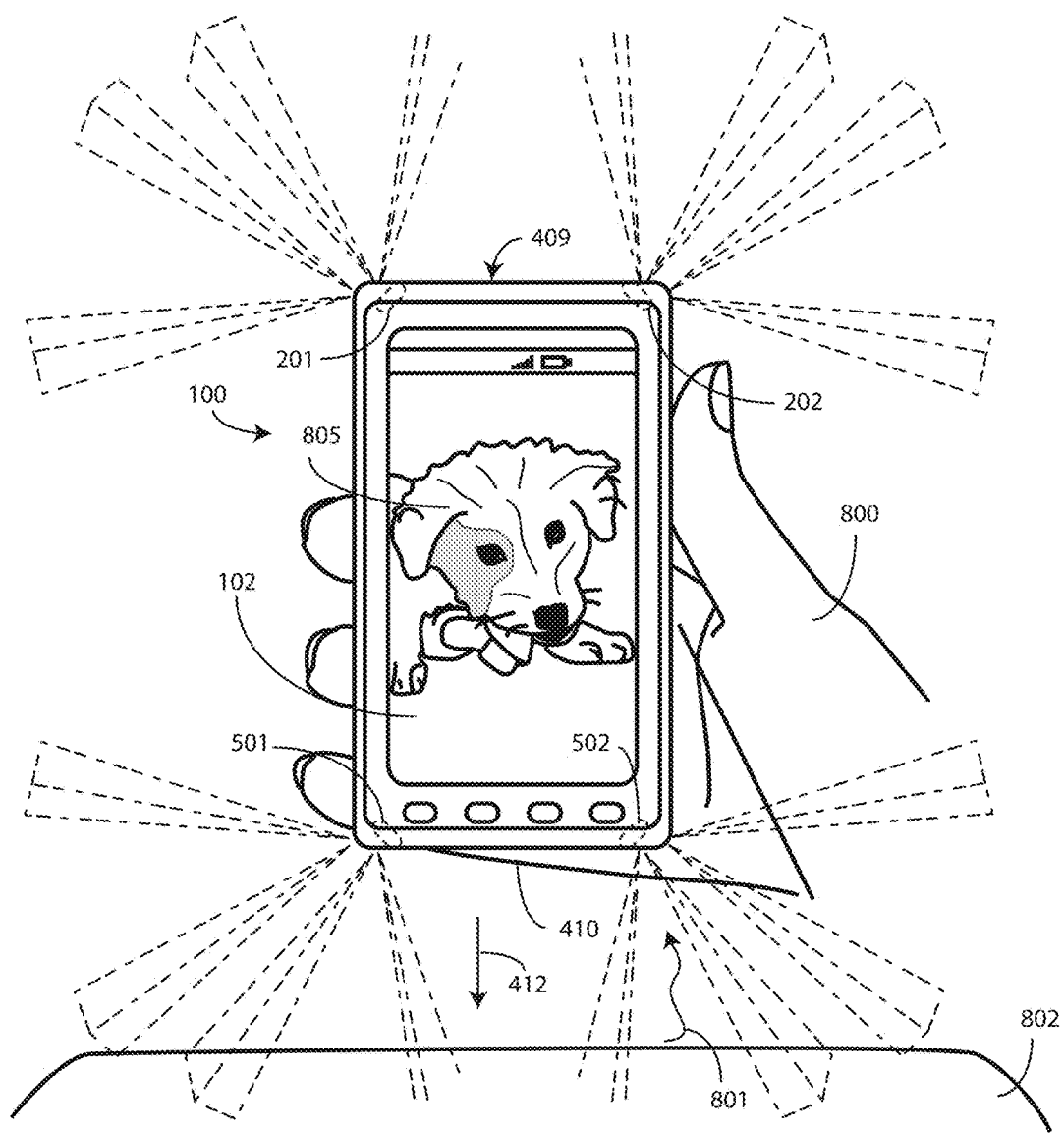
FIG. 16 illustrates one or more steps of one explanatory method in accordance with one or more embodiments of the disclosure.

Beginning with FIG. 16, a user 800 is holding the electronic device 100 toward the second end 410 and is standing along the second direction 412 relative to the electronic device 100. Accordingly, proximity sensor components 501, 502 receive infrared emissions 801 from the user's body 802 along the second direction 412. Since the user 800 is the only person within the thermal reception radius (540), the one or more processors (116) of the electronic device 100 operate the electronic device 100 in a normal of operation. Accordingly, the user 800 has free access to the information in the electronic device 100, as evidenced by the fact that the user 800 is looking at a picture 805 of their dog, B-man.

In this illustrative embodiment, the user 800 has turned privacy mode activation OFF. Note that for all embodiments above, the choice whether to allow the privacy mode to actuate is user definable. A user can override the privacy feature at any time.

The user 800 has an application installed on the electronic device 100 that presents an indication on the display 102 when another person is within the thermal reception radius. In one embodiment, this application only relies upon proximity sensor components 201, 202 disposed opposite the electronic device 100 from the user, which in this case are the two proximity sensor components 201, 202 disposed at the top 409 of the device. In another embodiment, the user 800 can configure the application to ignore the proximity sensor components 501, 502 closest to the body 802, i.e., those proximity sensor components 501, 502 that receive the highest magnitude infrared emissions. This prevents the display 102 from being cluttered with indications corresponding to the user 800 himself.

Figure 17:
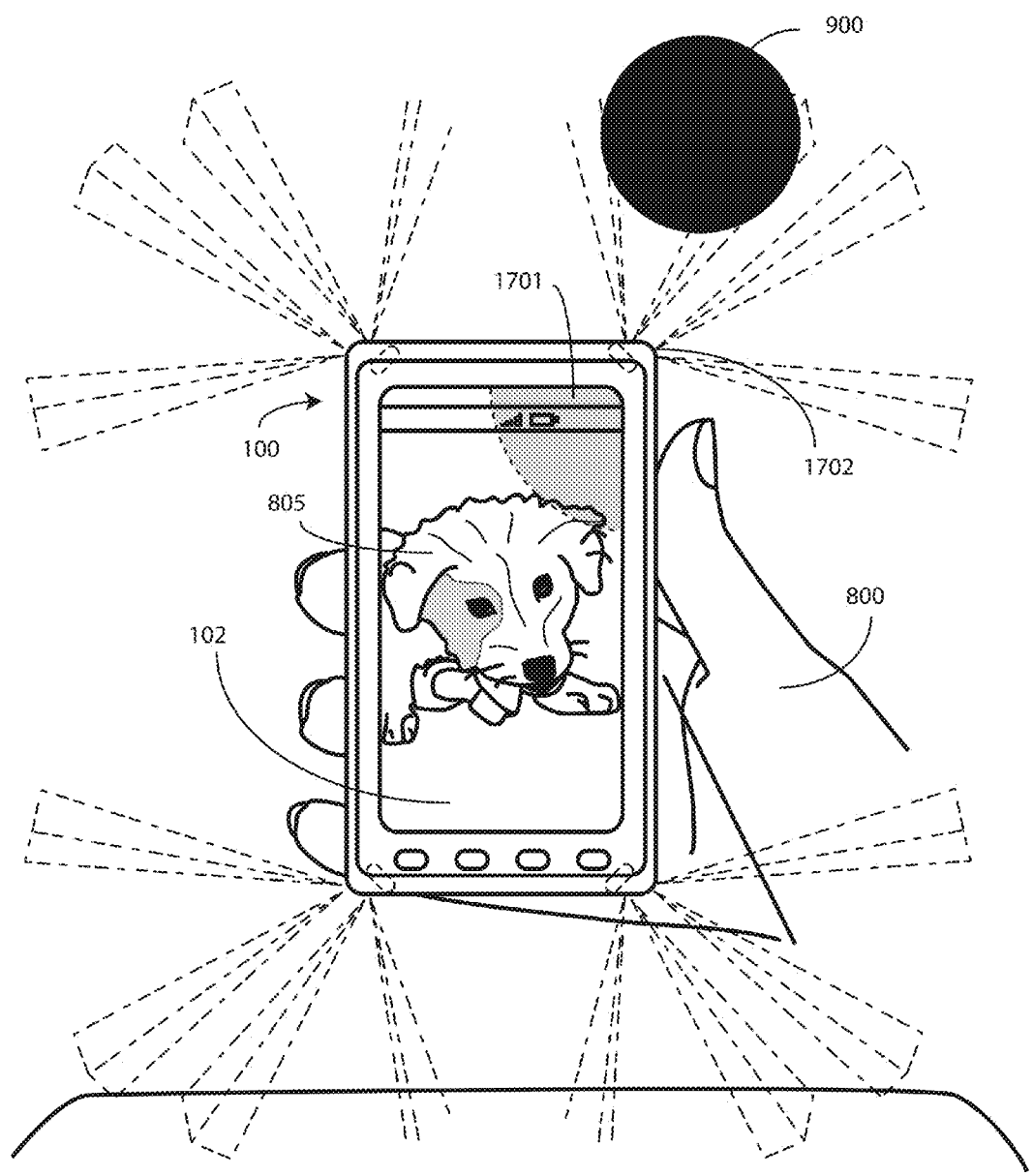
FIG. 17 illustrates one or more steps of one explanatory method in accordance with one or more embodiments of the disclosure.

As shown in FIG. 17, when another person 900 enters the thermal reception radius, the other person 900 is detected by these proximity sensor components 201, 202. Accordingly, the one or more processors (116) of the electronic device 100 can present an indication 1701 on the display 102. In one embodiment, the indication 1701 is superimposed along the display 102 so that the user 800 can see both the picture 805 of B-man and the indication 1701 simultaneously.

In this illustrative embodiment, the indication 1701 indicates to which corner 1702 of the electronic device 100 the person is closest as detected by which proximity sensor component 202 receives the strongest infrared emission. Accordingly, the user 800 can gaze at the picture 805 of B-man and can use the display 102 as a navigation device to avoid hitting bystanders, including the other person 900, while walking down the street. Other unique and innovative features, similar and different from the navigation feature In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. An electronic device, comprising:
   a housing;
   one or more processors;
   a plurality of proximity sensor components operable with the one or more processors, each proximity sensor component:
   comprising an infrared signal receiver to receive an infrared emission from an object external to the housing; and
   disposed about a perimeter of the housing with at least a first proximity sensor component defining at least a first reception beam oriented at least partially in a first direction from the housing and at least a second proximity sensor component defining at least a second reception beam oriented at least partially in a second direction relative to the housing, the second direction different from the first direction;

the one or more processors operable to:
- detect, with the at least a first proximity sensor component, a person is within a thermal reception radius of the electronic device along the first direction; and
- determine, with the at least a second proximity sensor component, whether another person is within the thermal reception radius of the electronic device along the second direction; and
- where only the person is within the thermal reception radius, operate the electronic device in a first mode of operation; and
- where the person and the another person are within the thermal reception radius, operate the electronic device in a second mode of operation.

2. The electronic device of claim 1, the first mode of operation comprising a normal mode of operation, the second mode of operation comprising a privacy mode of operation.

3. The electronic device of claim 1, the first mode of operation comprising a normal mode of operation, the second mode of operation comprising a quasi-private mode of operation.

4. The electronic device of claim 1, the plurality of proximity sensor components comprising four proximity sensor components disposed at corners of the housing, respectively.

5. The electronic device of claim 4, further comprising a display, the one or more processors further to present an indication on the display when the another person is within the thermal reception radius.

6. The electronic device of claim 5, the indication indicating to which corner of the housing the another person is closest.

7. The electronic device of claim 1, wherein at least the first proximity sensor component and the second proximity sensor component are each disposed behind a grille defining the at least a first reception beam oriented at least partially in the first direction from the housing and the at least a second reception beam oriented at least partially in the second direction relative to the housing.

8. The electronic device of claim 4, the at least a first proximity sensor component comprising two proximity sensor components disposed at a first end of the housing, the at least a second proximity sensor components comprising another two proximity sensor components disposed at a second end of the housing.

9. The electronic device of claim 1, the one or more processors to determine a magnitude of the infrared emission to determine a distance of the another person from the housing.

10. The electronic device of claim 1, the electronic device comprising a display, the one or more processors to preclude presentation of at least some information on the display when the another person is within the thermal reception radius.

11. The electronic device of claim 1, the one or more processors to execute a security operation of the electronic device when the another person is within the thermal reception radius.

12. A method for controlling an electronic device, comprising:
- detecting, with a first proximity sensor component, a first person is within a thermal reception radius of the electronic device along a first direction from the electronic device;
- where the first person is within the thermal reception radius, determining, with a second proximity detector component, whether a second person is within the thermal reception radius along a second direction from the electronic device, the second direction different from the first direction; and
- performing, by one or more processors operable with the plurality of proximity sensor components:
  - a control operation to operate the electronic device in a normal mode of operation when the only the first person is within the thermal reception radius; and
  - another control operation to operate the electronic device in a privacy mode of operation when the second person is also within the thermal reception radius.

13. The method of claim 12, the privacy mode of operation comprising precluding presentation of messages on a display of the electronic device.

14. The method of claim 12, the privacy mode of operation comprising presenting only a portion of messages on a display of the electronic device.

15. The method of claim 12, the privacy mode of operation comprising locking a display of the electronic device.

16. The method of claim 12, the privacy mode of operation comprising capturing personal identification indicia from a user interface.

17. The method of claim 12, the privacy mode of operation comprising reducing a volume of an audio output device.

18. The method of claim 12, further comprising identifying the first person, the control operation performed only when the first person is identified.

19. An electronic device, comprising:
- a housing;
- one or more processors;
- one proximity sensor component operable with the one or more processors and comprising an infrared signal receiver to receive an infrared emission from an object external to the housing; and
- a switching device to redirect a reception beam of the one proximity sensor component between being oriented at least partially in a first direction from the housing and being oriented at least partially in a second direction relative to the housing, the second direction different from the first direction;
- the one or more processors operable to:
  - detect, with the one proximity sensor component, a person is within a thermal reception radius of the electronic device along the first direction; and
  - determine, with the at least a second proximity sensor component, whether another person is within the thermal reception radius of the electronic device along the second direction; and
  - where only the person is within the thermal reception radius, operate the electronic device in a first mode of operation; and
  - where the person and the another person are within the thermal reception radius, operate the electronic device in a second mode of operation.

20. The electronic device of claim 19, the switching device defining one or more apertures.

* * * * *